US009070300B1

(12) United States Patent
Mohanty

(10) Patent No.: US 9,070,300 B1
(45) Date of Patent: Jun. 30, 2015

(54) SET OF VARIABLY ASSEMBLABLE POLYGONAL TILES WITH STENCIL CAPABILITY

(76) Inventor: Yana Mohanty, San Diego, CA (US)

( * ) Notice: Subject to any disclaimer, the term of this patent is extended or adjusted under 35 U.S.C. 154(b) by 101 days.

(21) Appl. No.: 13/302,122

(22) Filed: Nov. 22, 2011

Related U.S. Application Data

(60) Provisional application No. 61/422,037, filed on Dec. 10, 2010.

(51) Int. Cl.
*G09B 19/00* (2006.01)
*G09B 23/02* (2006.01)

(52) U.S. Cl.
CPC ................ *G09B 19/00* (2013.01); *G09B 23/02* (2013.01)

(58) Field of Classification Search
USPC ............ 434/33, 81, 96, 188, 211; 273/157 R; 428/33
See application file for complete search history.

(56) References Cited

U.S. PATENT DOCUMENTS

| 955,194 | A | * | 4/1910 | Peacock | 273/157 R |
| 1,558,165 | A | * | 10/1925 | Haswell | 273/294 |
| 2,738,594 | A | * | 3/1956 | Swingle | 434/212 |
| 2,885,207 | A | * | 5/1959 | Wormser | 273/157 R |
| 3,547,444 | A | * | 12/1970 | Williams et al. | 273/294 |
| 3,608,906 | A | * | 9/1971 | Odier | 273/157 R |
| 4,133,152 | A | * | 1/1979 | Penrose | 52/105 |
| 4,223,890 | A | * | 9/1980 | Schoen | 273/157 R |
| 4,343,471 | A | * | 8/1982 | Calvert | 273/157 R |
| 4,350,341 | A | * | 9/1982 | Wallace | 273/157 R |
| 4,358,115 | A | * | 11/1982 | Haas | 273/157 R |
| 4,546,025 | A | * | 10/1985 | Vaisman | 428/47 |
| 4,561,097 | A | * | 12/1985 | Siegel | 273/157 R |
| 4,620,998 | A | * | 11/1986 | Lalvani | 428/33 |
| 4,723,382 | A | * | 2/1988 | Lalvani | 52/81.1 |
| 4,842,905 | A | * | 6/1989 | Stech | 428/33 |
| 4,894,726 | A | * | 1/1990 | Steinhardt et al. | 358/3.2 |
| 5,108,291 | A | * | 4/1992 | Kuo | 434/211 |
| 5,203,706 | A | * | 4/1993 | Zamir | 434/172 |
| 5,368,301 | A | * | 11/1994 | Mitchell | 273/157 R |
| 5,481,841 | A | * | 1/1996 | Osborn | 52/311.2 |
| 5,520,388 | A | * | 5/1996 | Osborn | 273/157 R |
| 5,524,396 | A | * | 6/1996 | Lalvani | 52/81.1 |
| 5,643,084 | A | * | 7/1997 | Mirsky | 463/9 |
| 5,775,040 | A | * | 7/1998 | Lalvani | 52/311.2 |

(Continued)

OTHER PUBLICATIONS

Conway, J. H., Burgiel, H., & Goodman-Strauss, C. (2008). The Symmetries of Things. Wellesley, MA: A K Peters, Ltd. (pp. 15-49).*

*Primary Examiner* — Xuan Thai
*Assistant Examiner* — James Hull
(74) *Attorney, Agent, or Firm* — Mark Wisnosky

(57) ABSTRACT

This invention relates to interlocking rectangular and triangular tiles for use in tessellating a plane, teaching certain aspects of geometry and trigonometry, and creating decorative objects. The tiles comprising the invention, some with a design on them, tessellate the plane with periodic and non-periodic patterns based on the design as the basic unit of repetition. In particular; the tiles can be assembled to create any of the 17 possible plane periodic patterns. The tiles of the present invention can be used as a teaching tool for a partially structured exploration of plane periodic patterns, and for learning the mathematical notation for these patterns. They can also be used for teaching basic geometry to younger children through exploratory play. This invention can also be used as a stencil assembly, so that the patterns created can be transferred to a plane surface and used as decorations.

1 Claim, 37 Drawing Sheets

(56) References Cited

U.S. PATENT DOCUMENTS

| | | | |
|---|---|---|---|
| 5,945,181 A * | 8/1999 | Fisher | 428/33 |
| 6,309,716 B1 * | 10/2001 | Fisher et al. | 428/33 |
| 6,336,631 B1 * | 1/2002 | Volkert | 273/157 R |
| 6,672,588 B1 * | 1/2004 | Kielar et al. | 273/157 R |
| 6,732,639 B1 * | 5/2004 | Daniels | 101/127 |
| 7,284,757 B2 * | 10/2007 | Geissler | 273/157 R |
| 2005/0017447 A1 * | 1/2005 | Geshwind | 273/236 |
| 2006/0076732 A1 * | 4/2006 | Chiou | 273/153 R |
| 2012/0025462 A1 * | 2/2012 | Knowlton et al. | 273/157 R |
| 2012/0223479 A1 * | 9/2012 | Pabon | 273/236 |
| 2013/0036697 A1 * | 2/2013 | Riccobene | 52/311.1 |

* cited by examiner

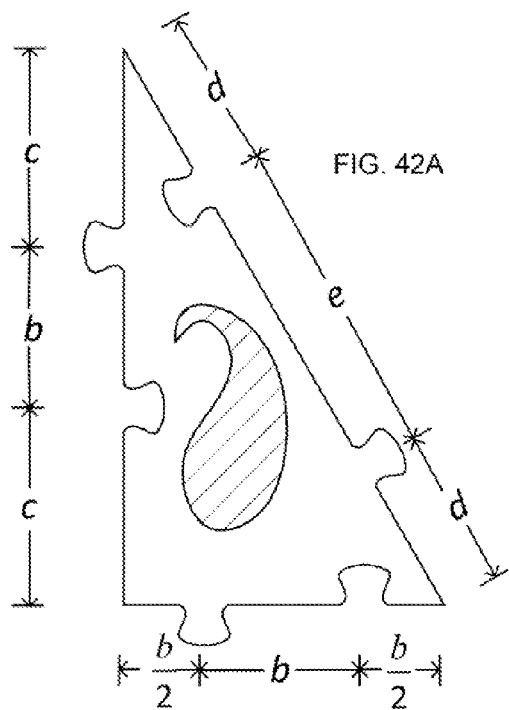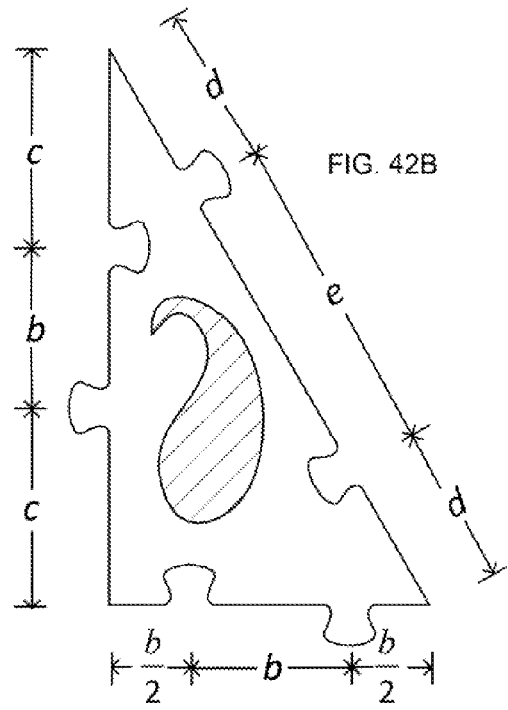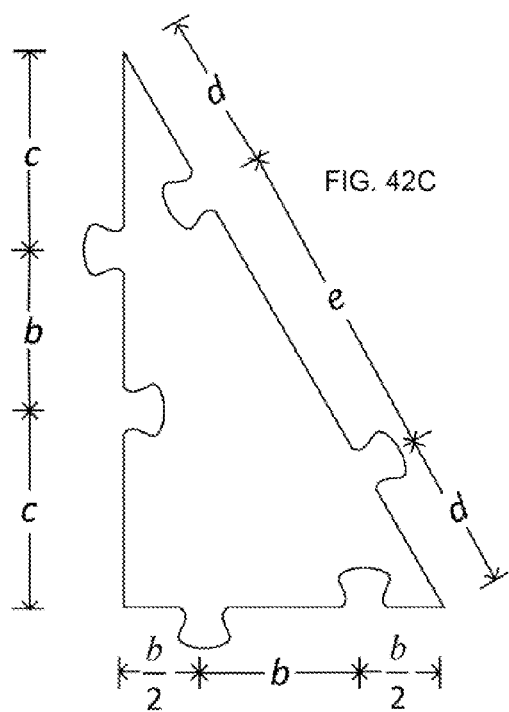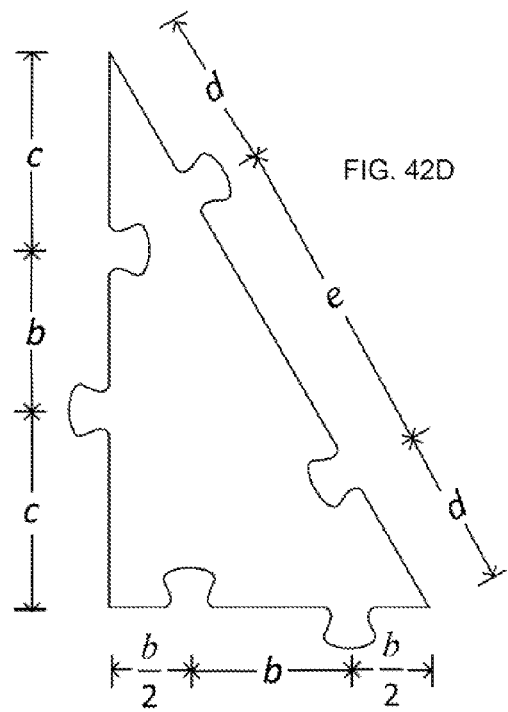

SET OF VARIABLY ASSEMBLABLE POLYGONAL TILES WITH STENCIL CAPABILITY

CROSS-REFERENCE TO RELATED APPLICATIONS

This applications claims the benefit of provisional patent application Ser. No. 61/422,037, filed 2010 Dec. 10 by the present inventor.

BACKGROUND

Prior Art

The following is a tabulation of some prior art that presently appears relevant:

U.S. Patents

| Patent Number | Kind Code | Issue Date | Patentee |
|---|---|---|---|
| 909603 | | Jan. 12, 1909 | Albert S. Janin |
| 3633286 | | Jan. 11, 1972 | Donald J. Maurer |
| 4133152 | | Jan. 9, 1979 | Roger Penrose |
| 4620998 | | Nov. 4, 1986 | Haresh Lalvani |
| 5203706 | | Apr. 20, 1993 | Amos Zamir |
| 5368301 | | Nov. 29, 1994 | Dennis E. Mitchell |
| 5619830 | | Apr. 15, 1997 | John A. L. Osborn |
| 6309716 | B1 | Oct. 30, 2001 | Adrian Fisher et al. |
| 7833077 | B1 | Nov. 16, 2010 | Felix J. Simmons, Jr. |

NONPATENT LITERATURE DOCUMENTS

Amenta, N., & Phillips, M. *Java Kali*. Retrieved from website: <http://www.geom.uiuc.edu/java/Kali/welcome.html>, 1996.

Conway, J. H., Burgiel, H., & Goodman-Strauss, C. (2008). *The Symmetries of Things*. Wellesley, Mass.: A K Peters, Ltd.

Gallian, J. A. (2009). *Contemporary Abstract Algebra*. Belmont, Calif.: Brooks Cole.

National Council of Teachers of Mathematics. *Geometry Standards*. Retrieved from website: <http://standards.nctm.org/document/appendix/geom.htm>, 2011.

Nicolas Schoeni, N., Hardake, W., & Chapuis, G. *Escher Web Sketch*. Retrieved from website: <http://escher.epfl.ch/escher/>, 1987.

BACKGROUND OF THE INVENTION

Plane periodic patterns have been used as decorations all over the world for millennia. Apart from being used in the design of floor tiles, wallpapers, textiles, and other articles, plane periodic patterns also occur in nature as cross sections of crystal lattices. As such, they have been studied by crystallographers since the $19^{th}$ century. It was at then that scientists discovered that all the plane periodic patterns fall into just 17 categories. Mathematicians consider two patterns in the same category to be "the same", even if the patterns look somewhat different to a lay person. This begs the question: what criteria are used to determine whether any two given patterns are in the same category, or, in other words, "the same"? The mathematically correct answer is that two patterns are "the same" if their groups of symmetry are the same. A pattern's group of symmetry is the set of all the moves (such as rotations, reflections, translations, or glide reflections) one can perform on a pattern without changing it. This definition of "the same" with regard to plane periodic patterns will be used throughout this document.

Some definitions are in order. The following notation, henceforth referred to as the Conway notation, will be used for the 17 plane periodic patterns: *632, 632, 3*3, *333, 333, *442, 442, 4*2, 2*22, 22*, 2222, *2222, **, *X, XX, 22X, O. The patterns, together with their notation, are shown in FIG. 7. Patterns *632 and *442 will be referred to as the "parent" patterns, since all the other 15 patterns can be derived from them.

The "fundamental domain" of a pattern is the smallest part of the pattern based on which the entire pattern can be constructed. Some patterns have a uniquely defined fundamental domain, while others have fundamental domains of more than one possible shape.

Some of the tiles comprising the present invention differ from one another only in terms of the presence of a design. The tiles that do not have a design will be referred to as "plain".

A tile and its "complement" are the same size and shape. The only difference between them is that the genders of their corresponding male and female coupling elements are opposite. Two complementary tiles fit together so that the designs on each tile are mirror images of one another.

DISCUSSION OF KNOWN ART

The "17 wallpaper patterns," as they are commonly known, have been the subject of rigorous mathematical research, of which the most recent and complete exposition can be found in (Conway, Burgiel, & Goodman-Strauss, The Symmetries of Things, 2008, pp. 15-49). This work describes one of the standard notations for the patterns, known as the "Conway notation" and shows how this notation holds the key to the proof of why there are only 17 possible patterns. Conway et al. go further to show the relationships between the various patterns and the different ways they can be colored. They put these findings in a mathematical framework using group theory, which is an extremely important and powerful tool in the study of mathematics.

Given both the visual and mathematical appeal of planar patterns, they have been a popular subject of study for students of a variety of levels. At the college level, students are taught to identify each of the 17 patterns in textbooks such as (Gallian, 2009, pp. 467-478). For students wishing to create an electronic version of any of the 17 patterns based on a single motif, there is a number of free software packages available on the internet. These include Escher Web Sketch (Nicolas Schoeni, Hardake, & Chapuis) and Java Kali (Amenta & Phillips, 1996). Both of these programs can create any of the 17 patterns in seconds, making them effective tools for demonstration. However, the speed and the method with which the patterns are drawn on the screen make it difficult for most users to learn about the structure and identification of the patterns from these programs. All the elements of the tiling array are drawn on the screen simultaneously, so that the user has a hard time grasping the symmetries (i.e rotations, translations, glide reflections, or reflections) that generate the entire pattern.

There are infinitely many ways to create tessellations, and much work has been done in the area of designing tessellating articles. Some examples can be seen in U.S. Pat. No. 909,603 (1909) to Janin, U.S. Pat. No. 4,133,152 (1979) to Penrose, U.S. Pat. No. 4,620,998 (1986) to Lalvani, U.S. Pat. No. 5,619,830 (1997) to Osborn, and U.S. Pat. No. 6,309,716

(2001) to Fisher. The above patents disclose sets of tiles that can be assembled into either periodic or non-periodic planar patterns. However, they neither attempt to construct the complete set of plane periodic patterns, nor claim that this is possible.

U.S. Pat. No. 5,368,301 (1994) issued to Mitchell discloses a puzzle composed of isosceles right triangle pieces that are similar in shape to some of the pieces in the present invention, as well as equilateral triangles. It is not possible to construct the complete set of all 17 repeating plane patterns with this set, even if one were to work with a multitude of identical tiles. Moreover, the isosceles right triangle pieces in the present invention have male and female coupling elements that are spaced differently than those in Mitchell's art. This allows for more ways to assemble the tiles.

U.S. Pat. No. 7,833,077 (2010) due to Simmons, Jr. discloses interlocking blocks that can be assembled in a variety of ways. Their cross sections are somewhat similar to the tiles in the present invention, but they cannot be assembled into all of the 17 repeating planar patterns.

U.S. Pat. No. 3,633,286 (1972) to Maurer and U.S. Pat. No. 5,203,706 (1993) to Zamir disclose interlocking tiles with a stencil portion. Both of these inventions can be used to draw a very limited number of repeating planar patterns due to the shape of the tiles (rectangular) and the placement of the interlocking elements.

The present invention differs from all prior art in the fields of tessellation and stencils in that it (1) combines the tessellating and stenciling capabilities to create any of the 17 possible plane periodic patterns (2) is a teaching tool for learning about the basic symmetries as well as the plane periodic patterns. Math education experts recommend that students starting in $3^{rd}$ grade "predict and describe the results of sliding, flipping, and turning two-dimensional shapes" (National Council of Teachers of Mathematics). They can learn to do this by exploring the various juxtapositions of the tiles comprising the invention. The invention is also a tool for helping students learn the properties of 30°-60°-90° triangles 45°-45°-90° triangles.

The present invention has an advantage over polygonal tiles with straight edges in that the possibilities of combinations are reduced by the arrangement of the male and female coupling elements. Thus, the students are somewhat guided toward discovering mathematical properties by the way the tiles mate with each other. Because of this guiding structure built into the tiles, less teacher supervision is required with using the present invention compared to using traditional straight-edged polygons.

OBJECTS OF THE INVENTION

It is the primary object of the present invention to provide a set of tiles as a manipulative educational aid for studying plane periodic patterns through the process of constructing them, and for learning the mathematical notation for these patterns.

It is another object of the invention to provide a set of tiles as a manipulative educational aid for learning basic geometrical and trigonometric concepts.

It is an object of the invention to provide a set of tiles as a manipulative educational aid for learning the four types of symmetry: translation, rotation, reflection, and glide reflection.

It is a further object of the invention to provide a stenciling assembly tracing planar patterns for the purpose of decoration and amusement.

SUMMARY

A set of tiles for covering a surface consists of nine types of tile. The basic shape of each tile is a 30°-60°-90° triangle, a 45°-45°-90° triangle, or a rectangle. Some tiles have an asymmetrical design cut out in the fashion of a stencil, while others are plain. The tiles have jigsaw puzzle-like edges, with the male and female coupling elements placed so that the tiles can be juxtaposed only in certain prescribed configurations. Either periodic or non-periodic patterns can be assembled using the tiles. With periodic patterns, a fundamental domain can always be constructed using one or more tiles. This has the advantage of reinforcing the concept of a fundamental domain in the mind of the user. After creating a repeating pattern, the user can replace some of the tiles with designs on them with identically shaped plain tiles, thereby creating a new repeating pattern that is related to the original one he created. By working in this fashion and restricting himself to working with one shape at a time (e.g. isosceles triangle), the user can gradually discover the various families of patterns, along with their Conway notation, all of which comprise complete set of plane periodic patterns. The user then has the option of tracing the patterns in the stenciled tiles. This feature serves two functions. First, the user can keep a record of his design and utilize it for decorative or other purposes. Second, the pattern can be colored, creating yet more repeating patterns. The tiles can also be used by school age children for exploring basic geometry. Children can be challenged to create a multitude of different polygons or patterns by juxtaposing a set of tiles. In addition, the tiles are a tool in teaching the properties of 30°-60°-90° triangle and 45°-45°-90° triangles, which are key elements in the study of trigonometry.

DRAWINGS

Figure 7:
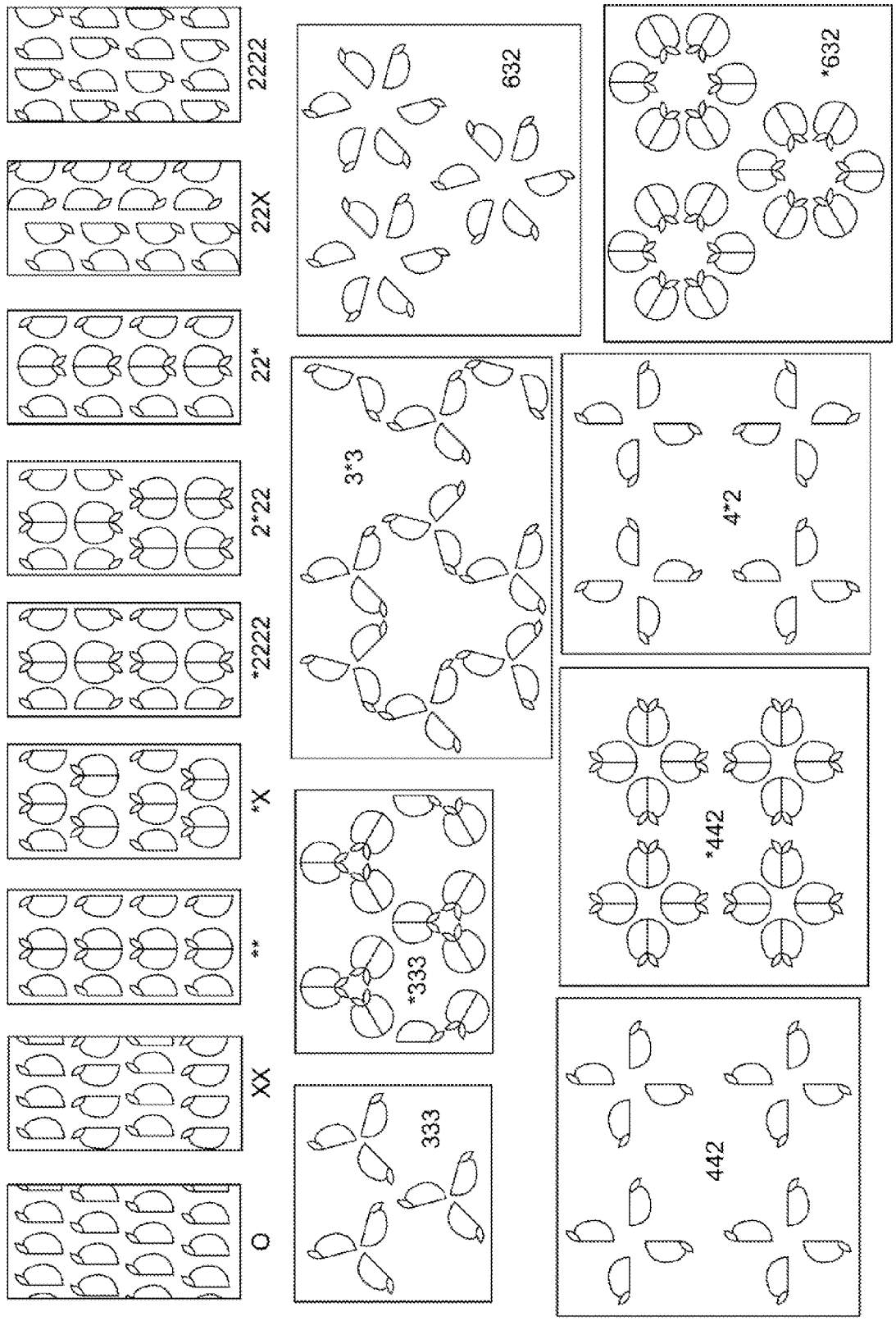

FIG. 7 lists the 17 plane periodic patterns along with their labels in the Conway notation.

Figure 8:
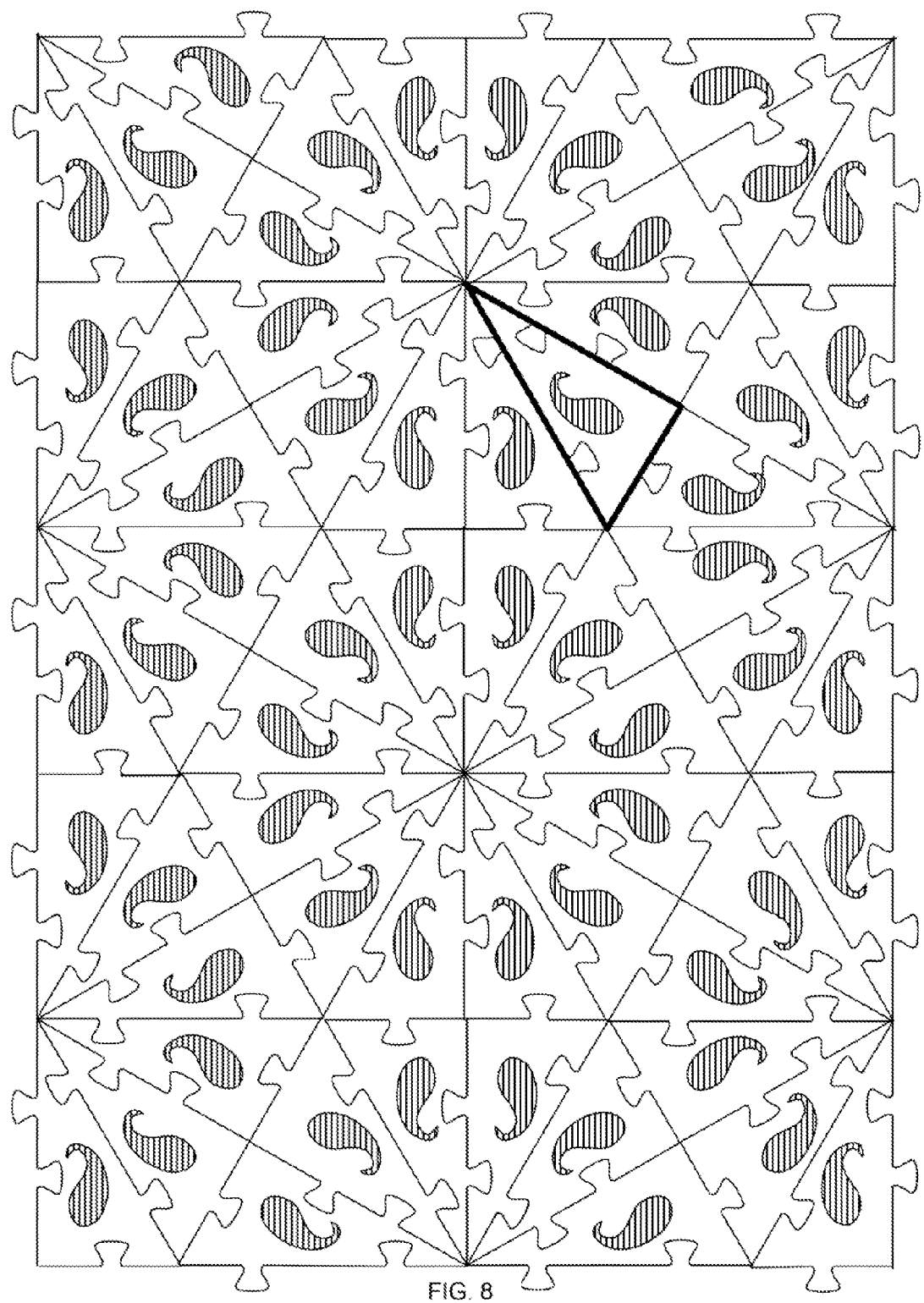

FIG. 8 is a top view of the *632 pattern. The fundamental domain is outlined in bold.

Figure 9:
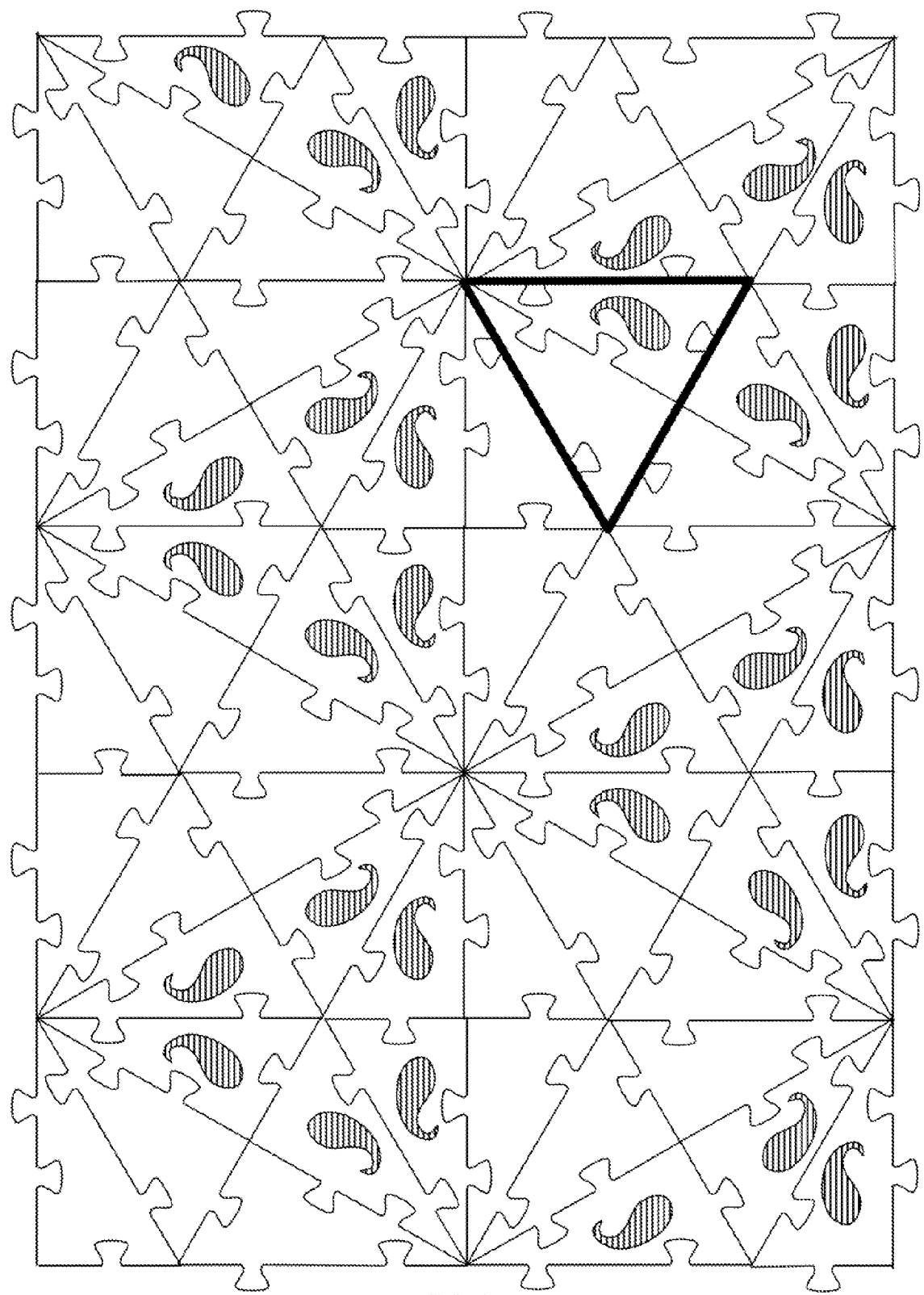

FIG. 9 is a top view of the *333 pattern. The fundamental domain is outlined in bold.

Figure 10:
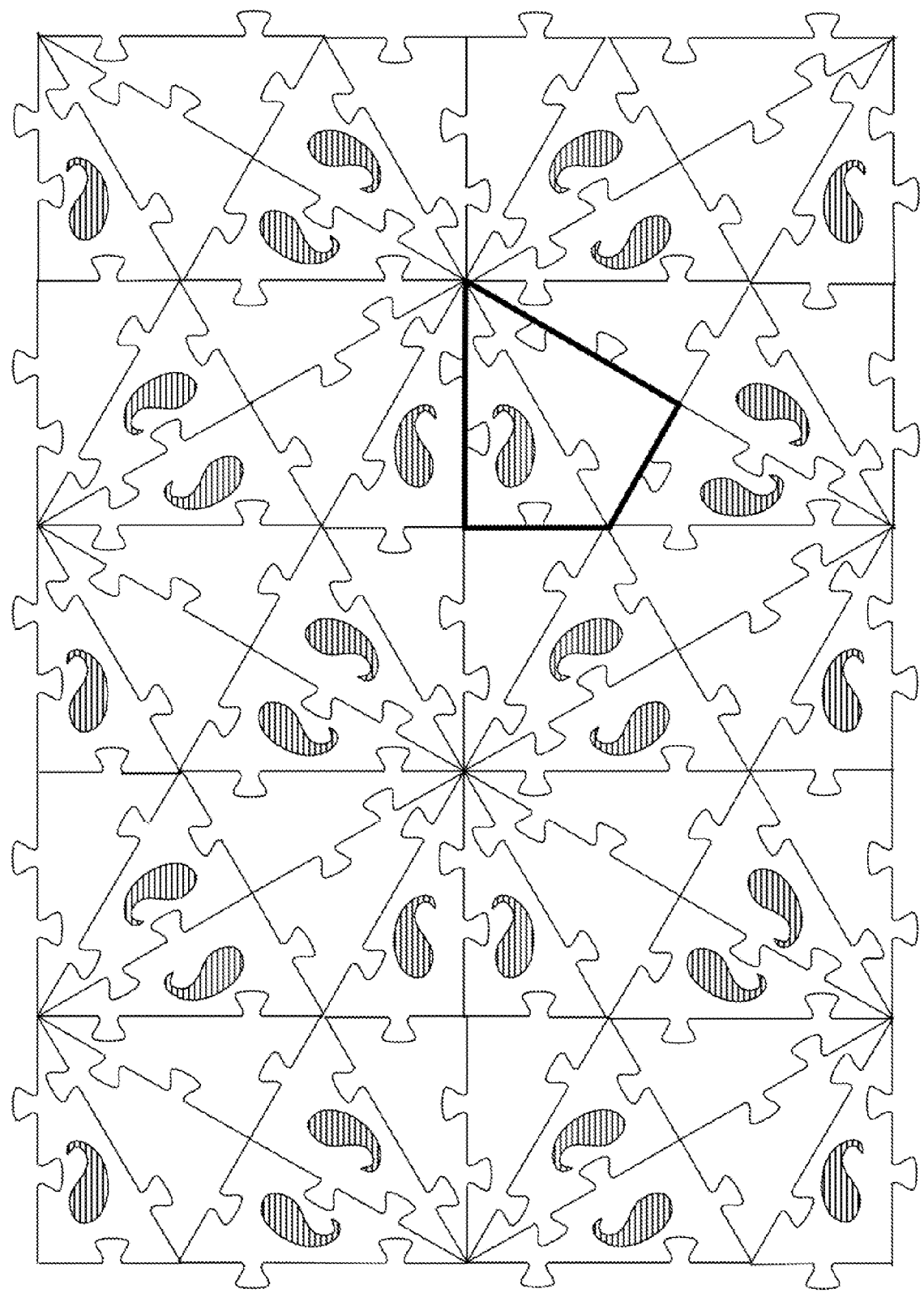

FIG. 10 is a top view of the 3*3 pattern. A fundamental domain is outlined in bold.

Figure 11:
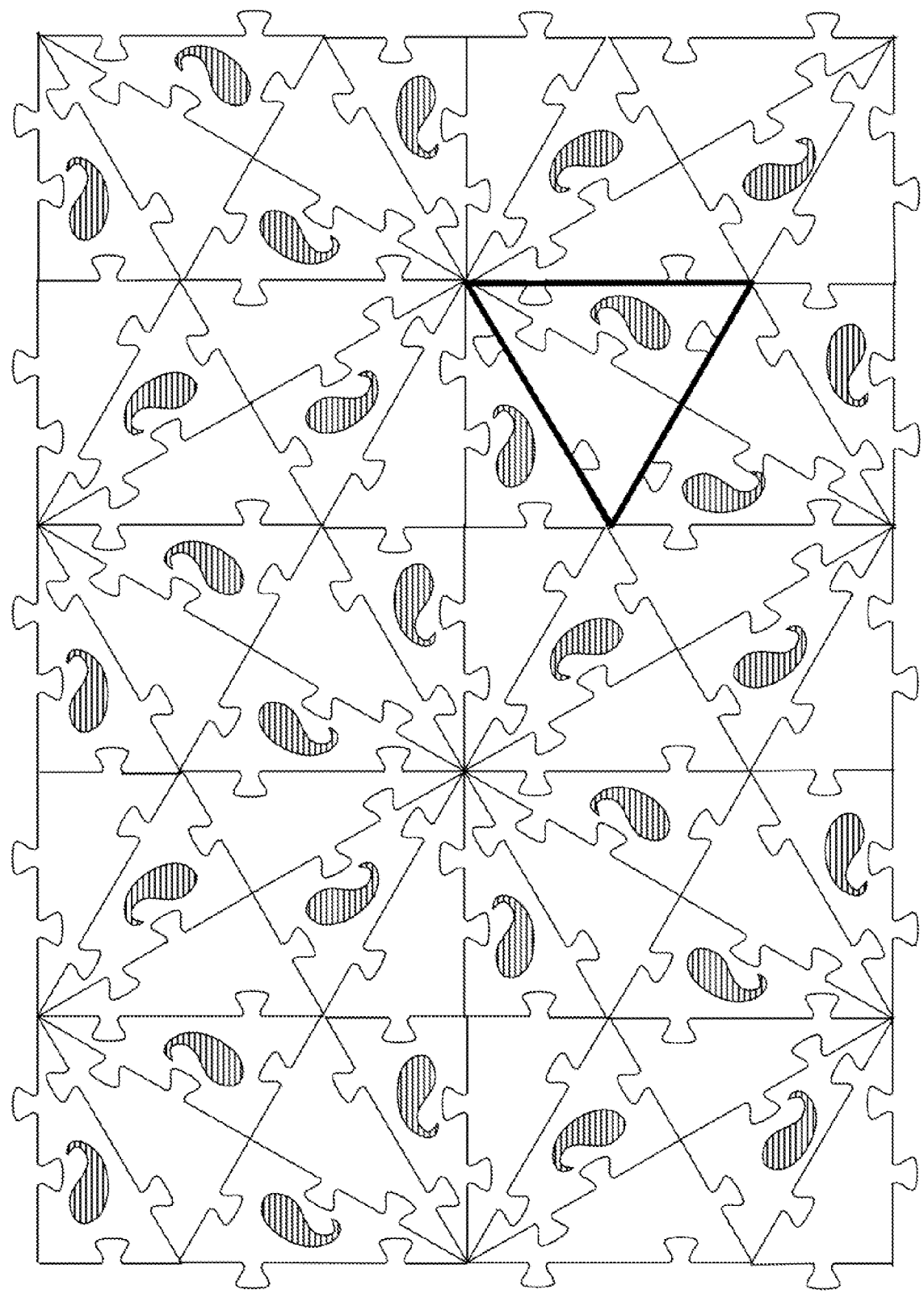

FIG. 11 is a top view of the 632 pattern. A fundamental domain is outlined in bold.

Figure 12:
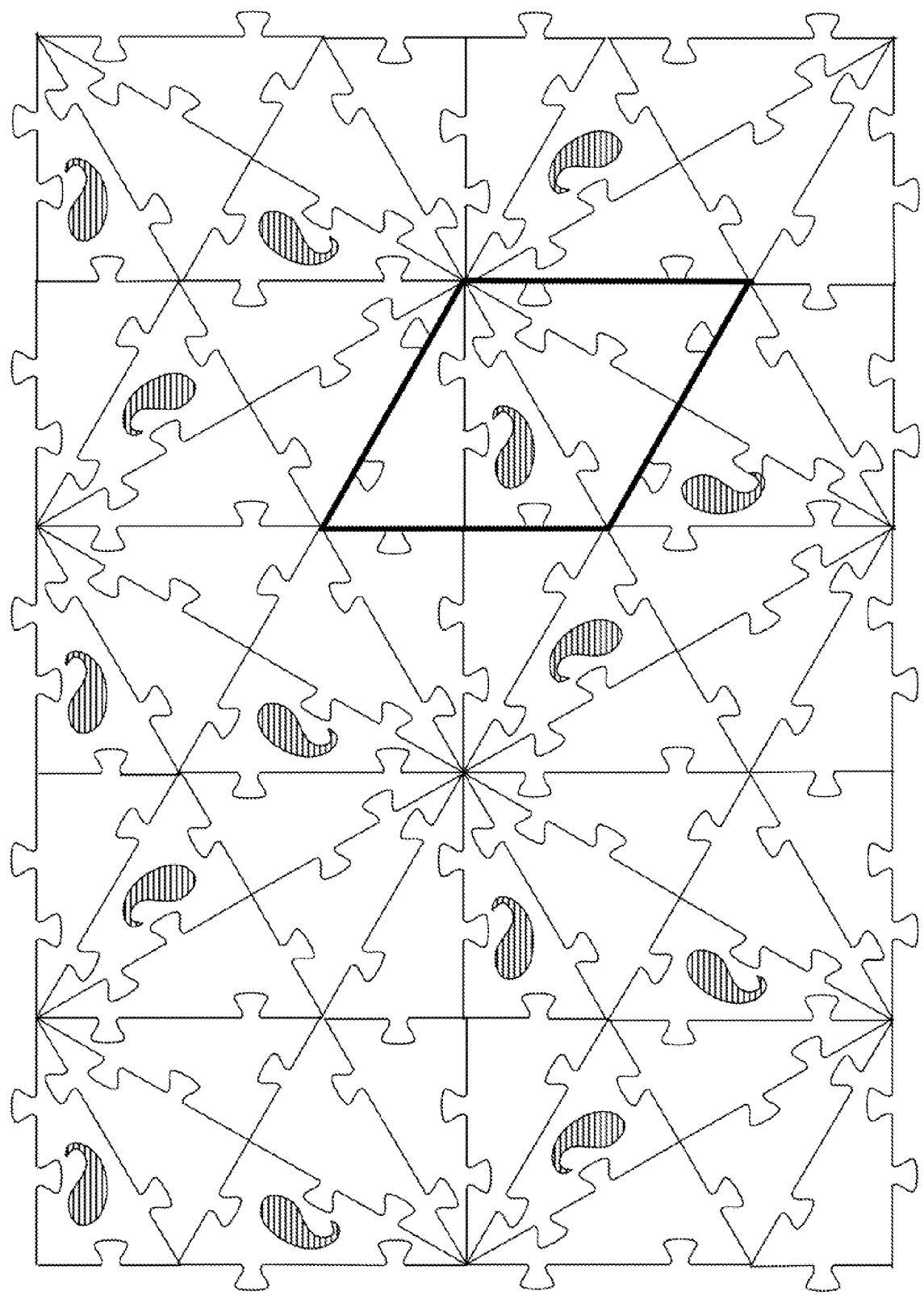

FIG. 12 is a top view of the 333 pattern. A fundamental domain is outlined in bold.

Figure 13:
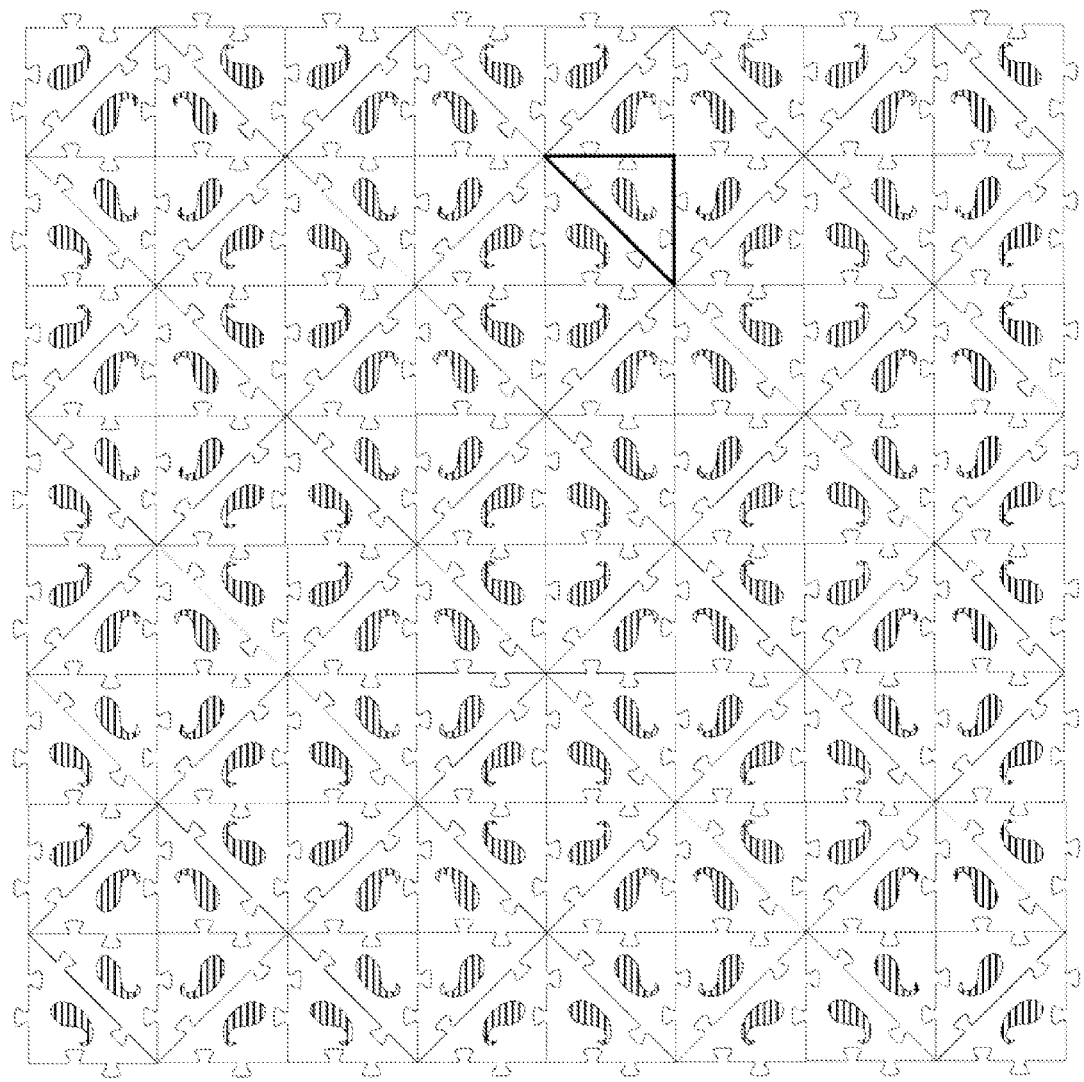

FIG. 13 is a top view of the *442 pattern. The fundamental domain is outlined in bold.

Figure 14:
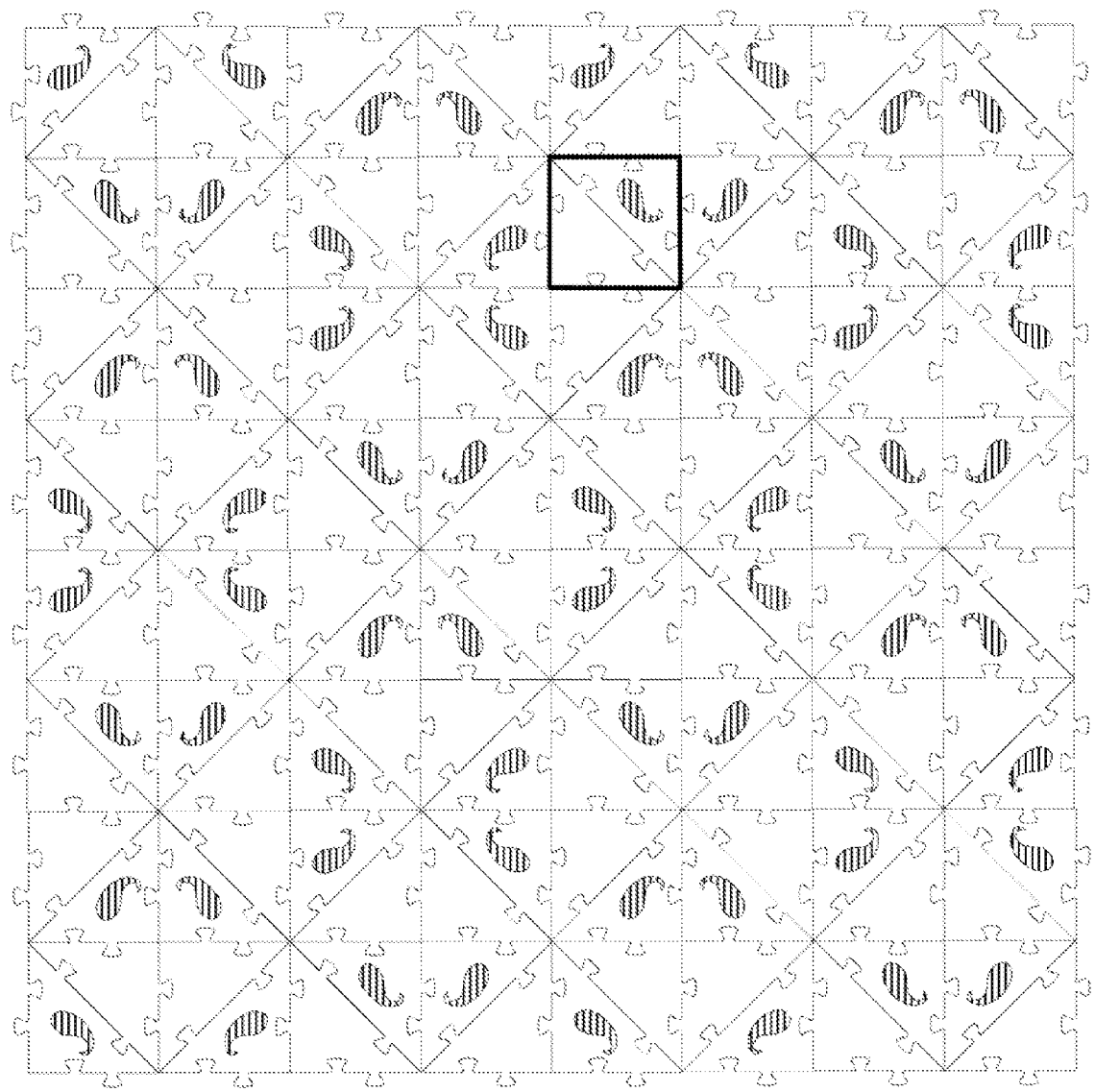

FIG. 14 is a top view of the 4*2 pattern. A fundamental domain is outlined in bold.

Figure 15:
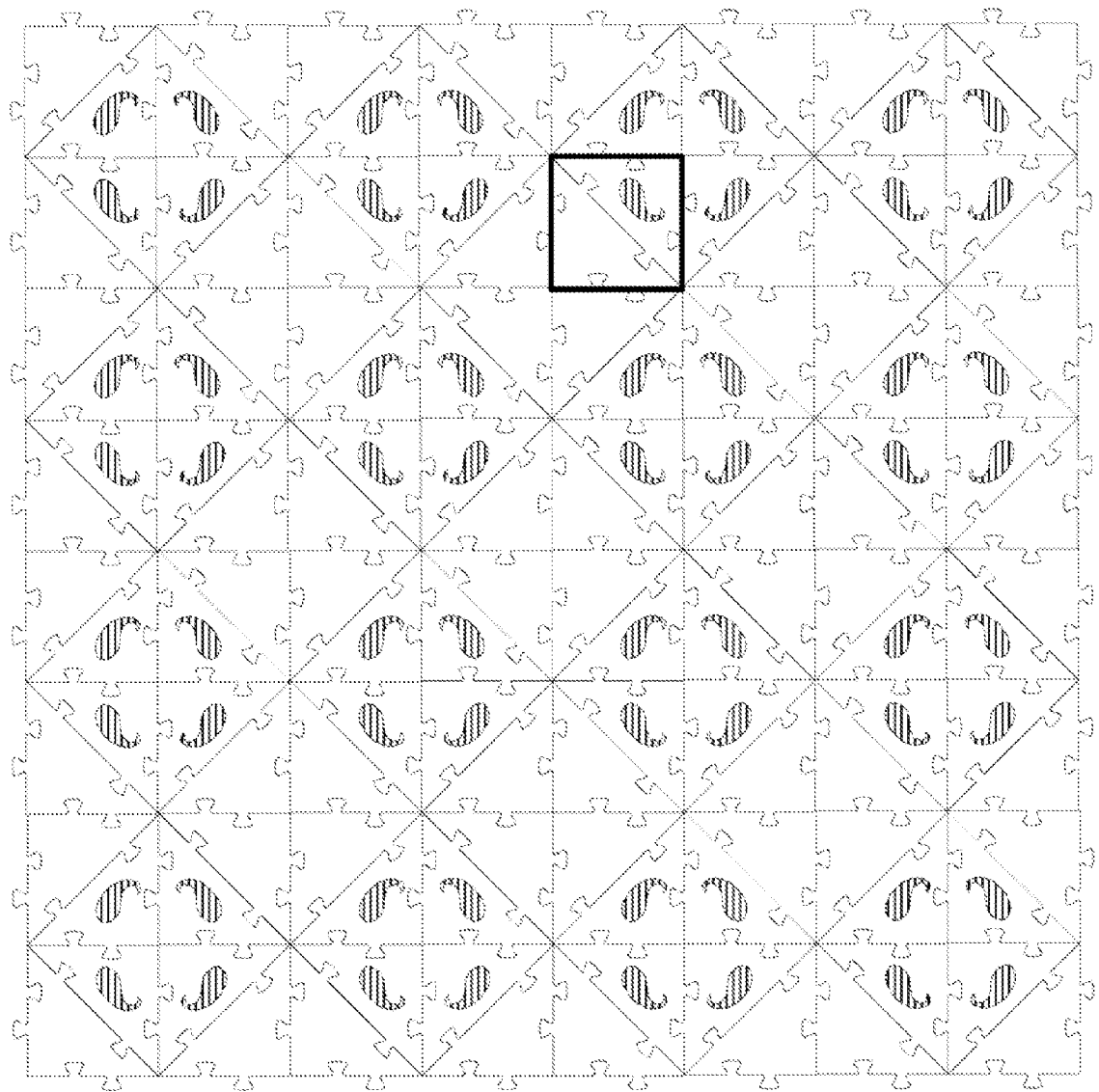

FIG. 15 is a top view of the *2222 pattern. The fundamental domain is outlined in bold.

Figure 16:
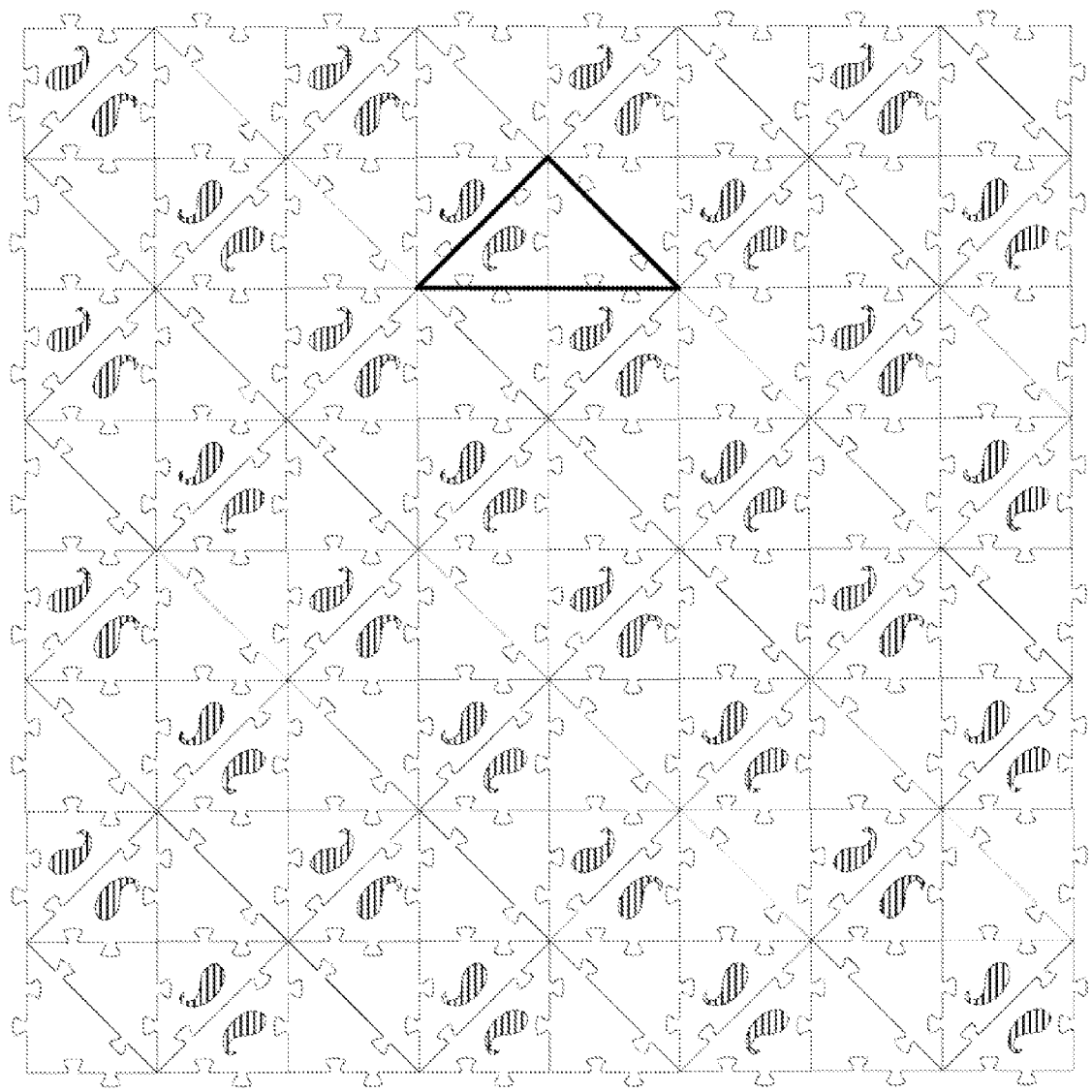

FIG. 16 is a top view of the 2*22 pattern. A fundamental domain is outlined in bold.

Figure 17:
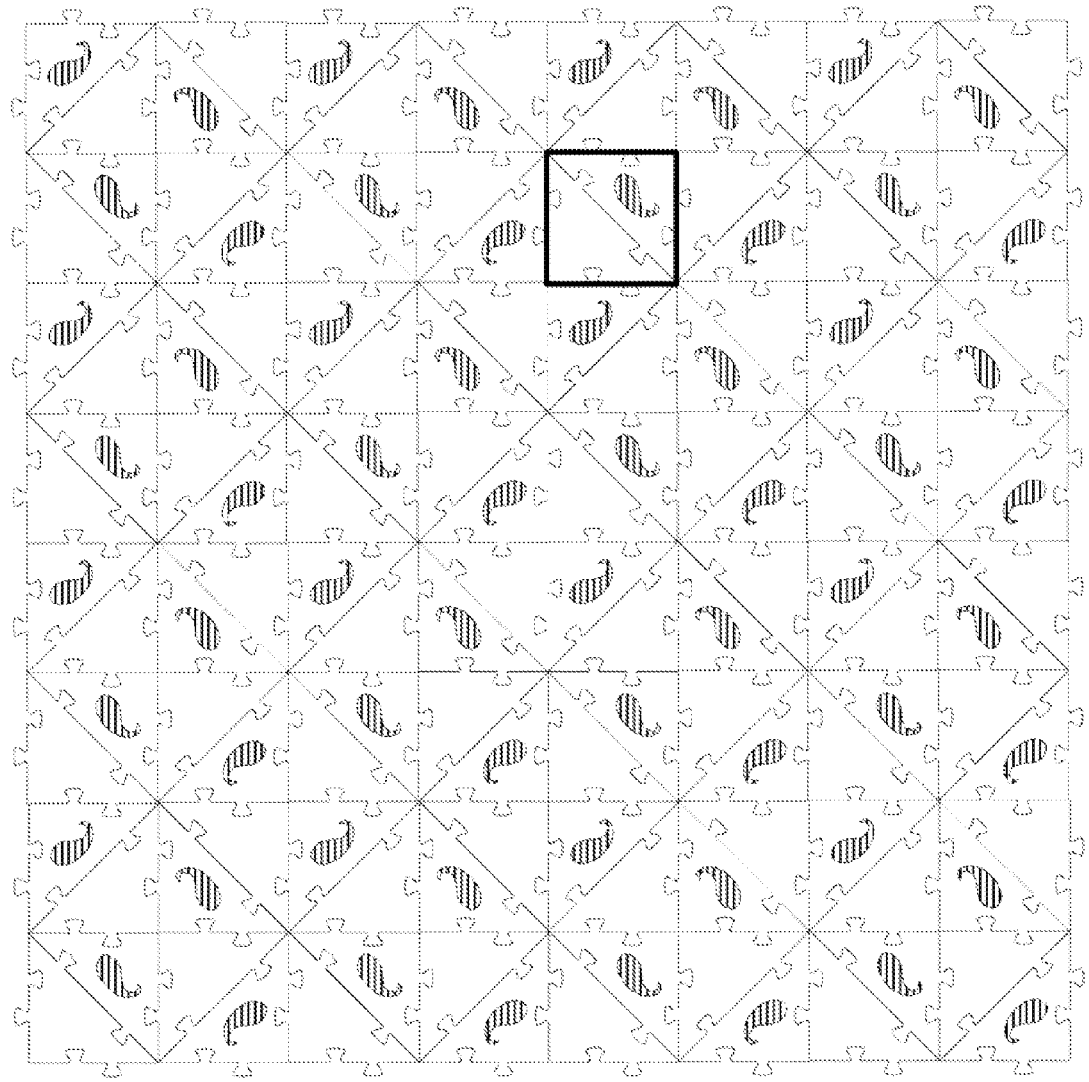

FIG. 17 is a top view of the 442 pattern. A fundamental domain is outlined in bold.

Figure 18:
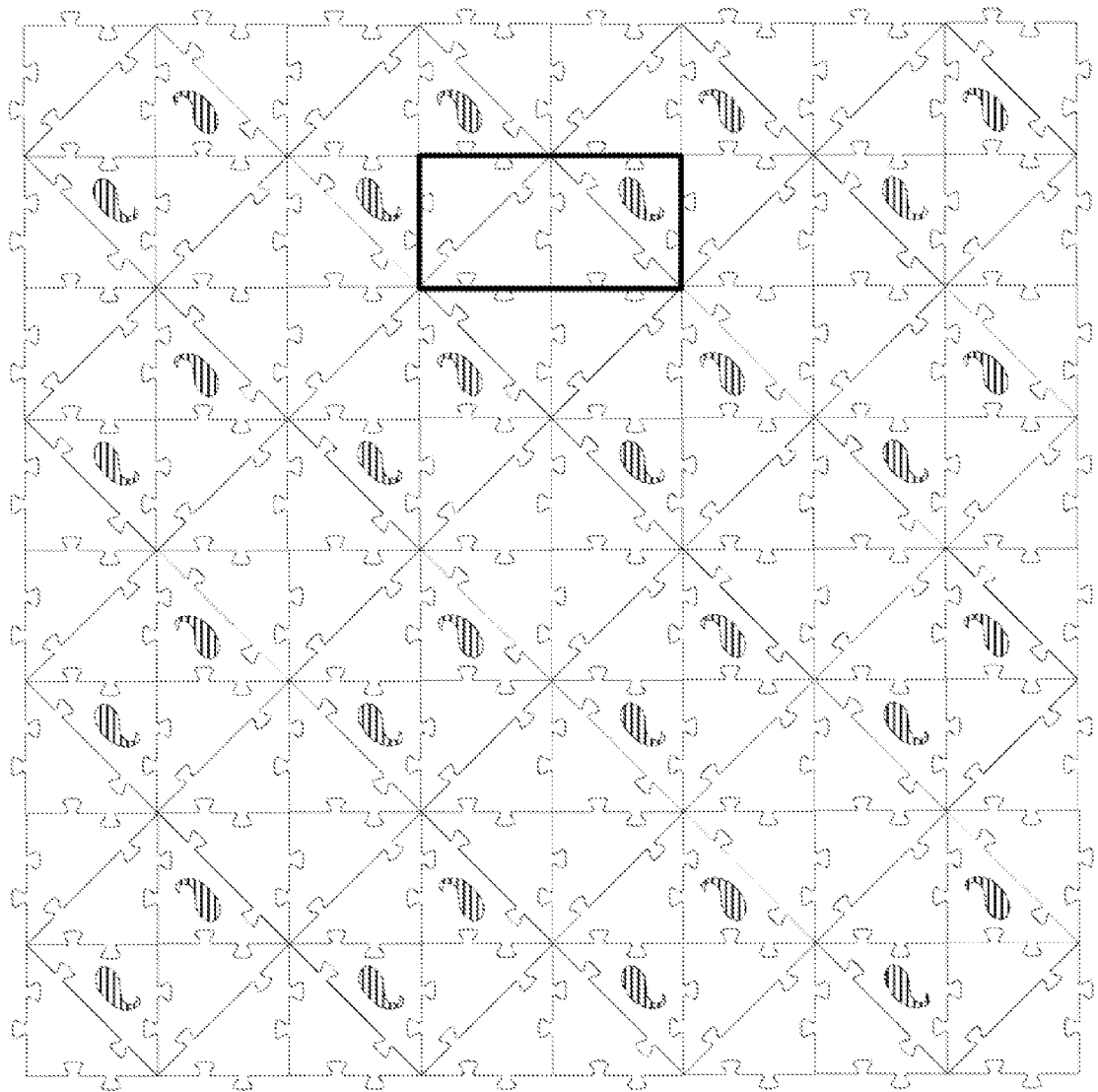

FIG. 18 is a top view of the 2222 pattern. A fundamental domain is outlined in bold.

Figure 19:
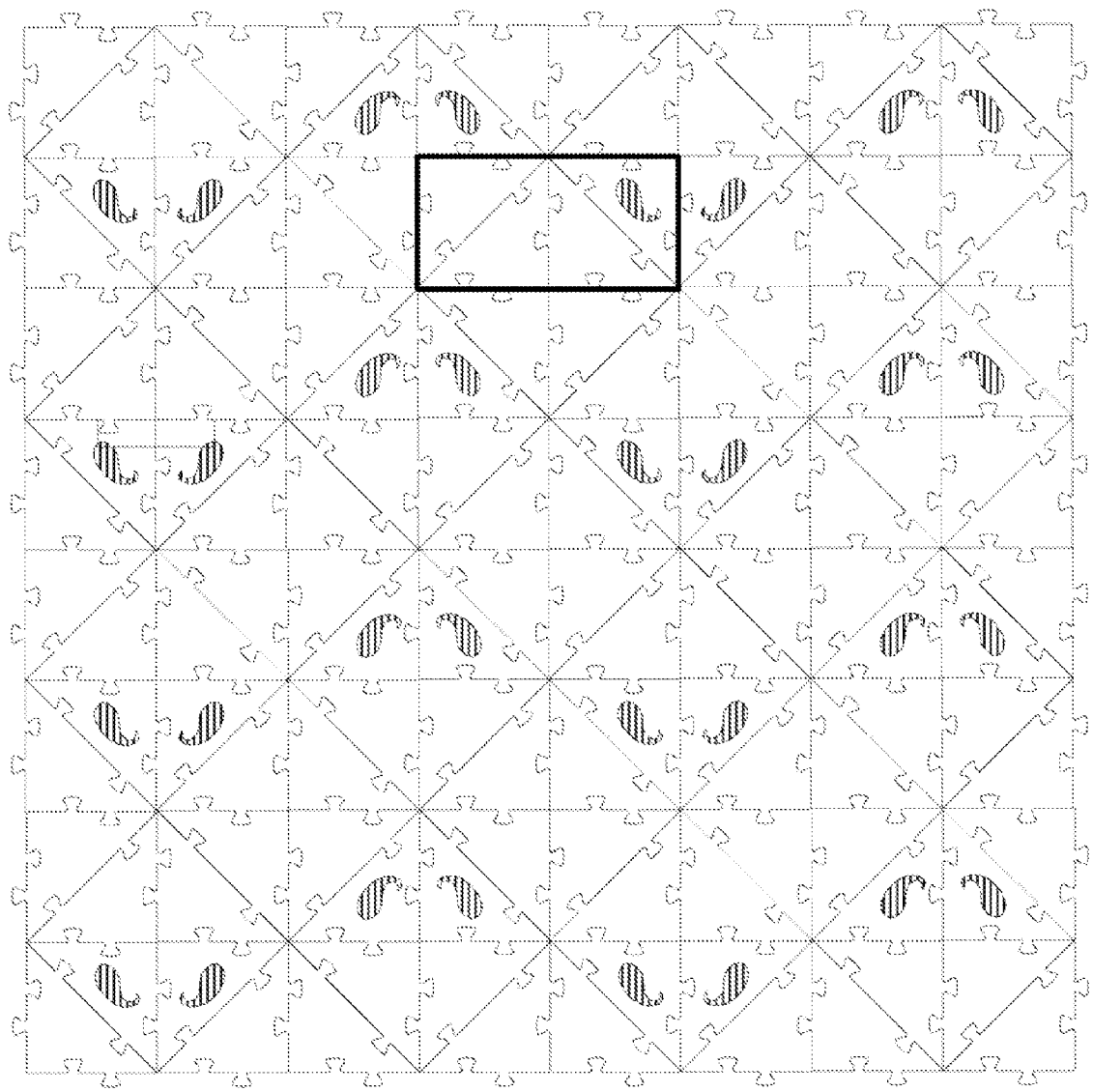

FIG. 19 is a top view of the 22* pattern. A fundamental domain is outlined in bold.

Figure 20:
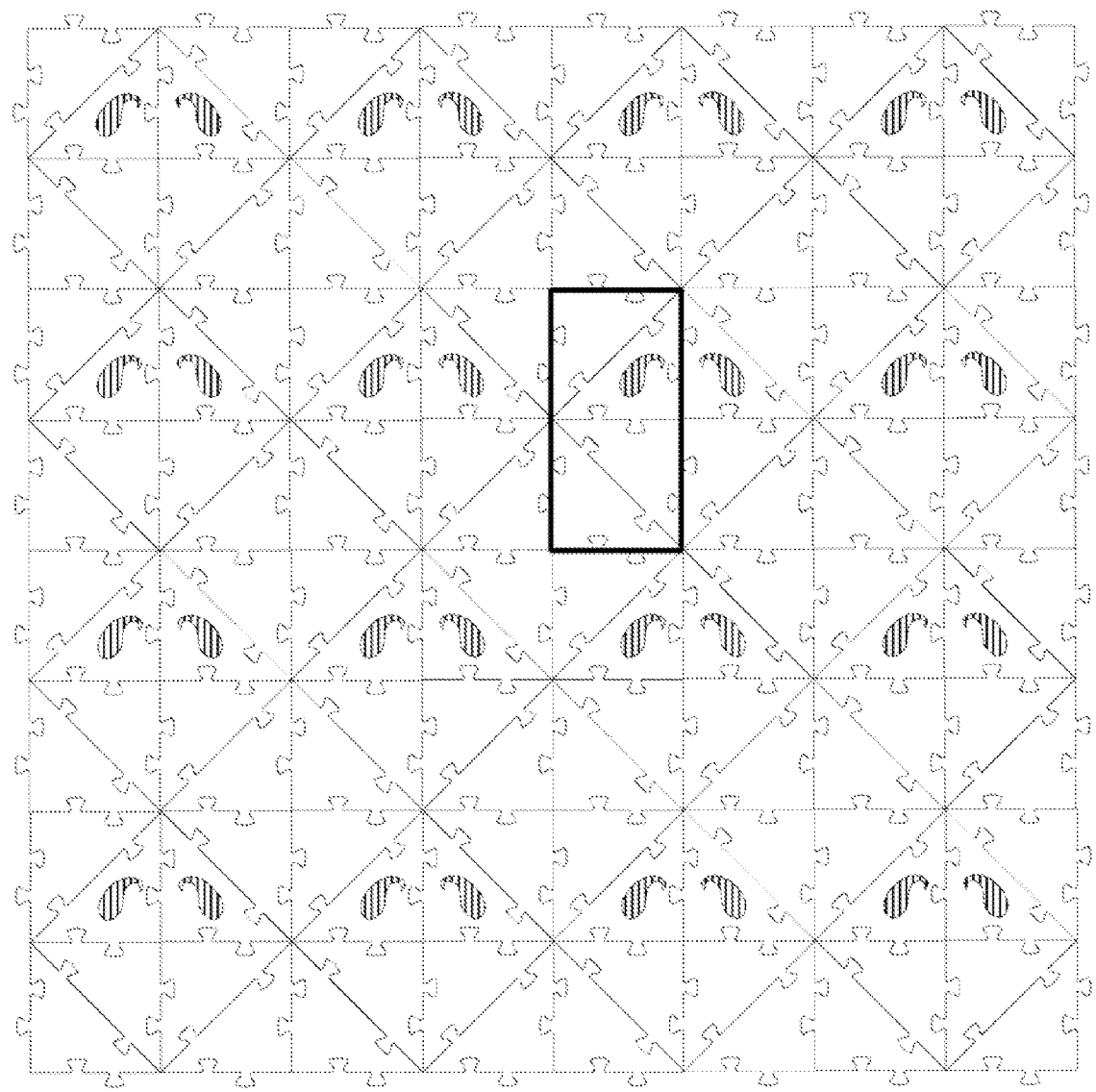

FIG. 20 is a top view of the ** pattern. A fundamental domain is outlined in bold.

Figure 21:
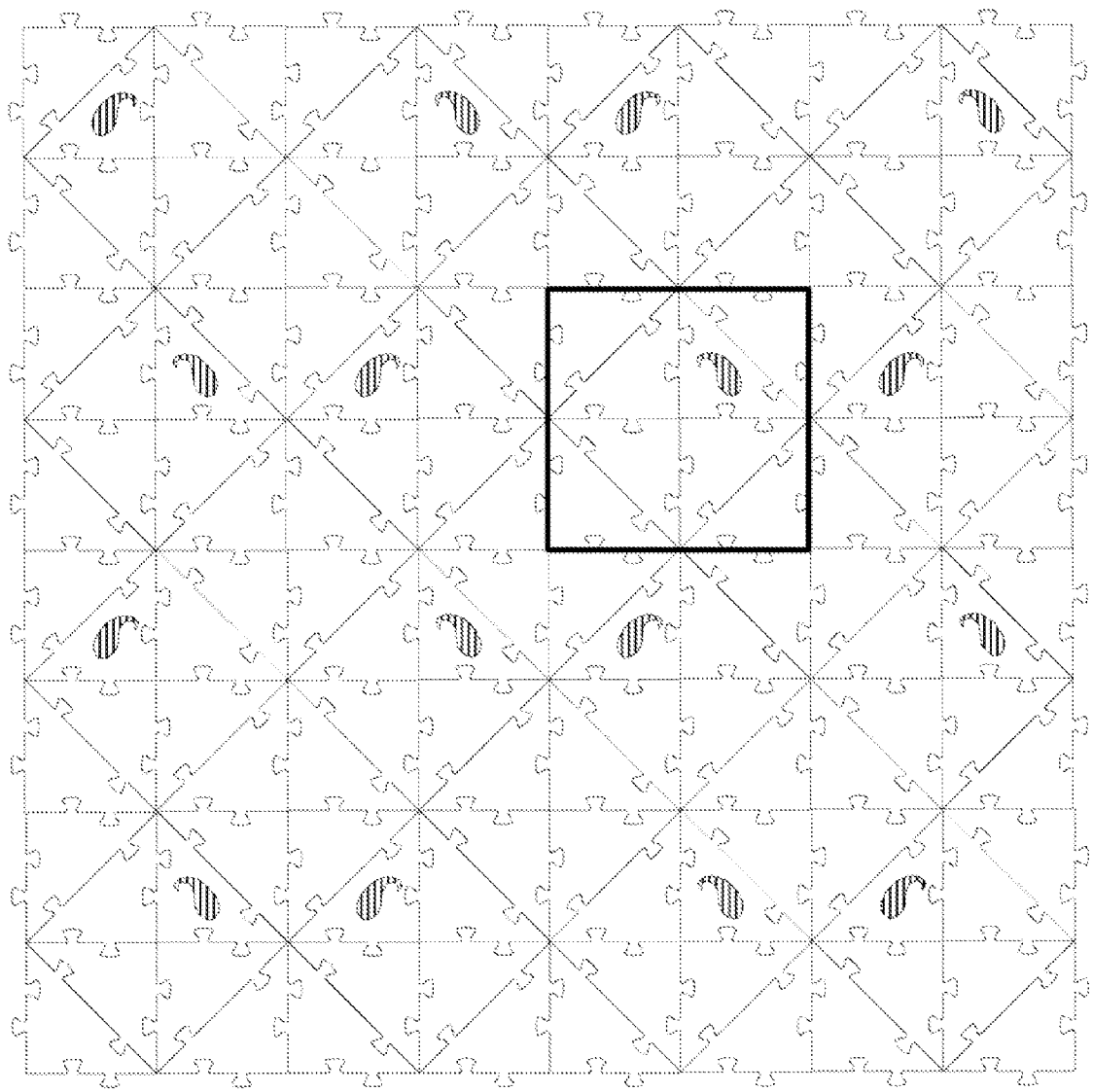

FIG. 21 is a top view of the *X pattern. A fundamental domain is outlined in bold.

Figure 22:
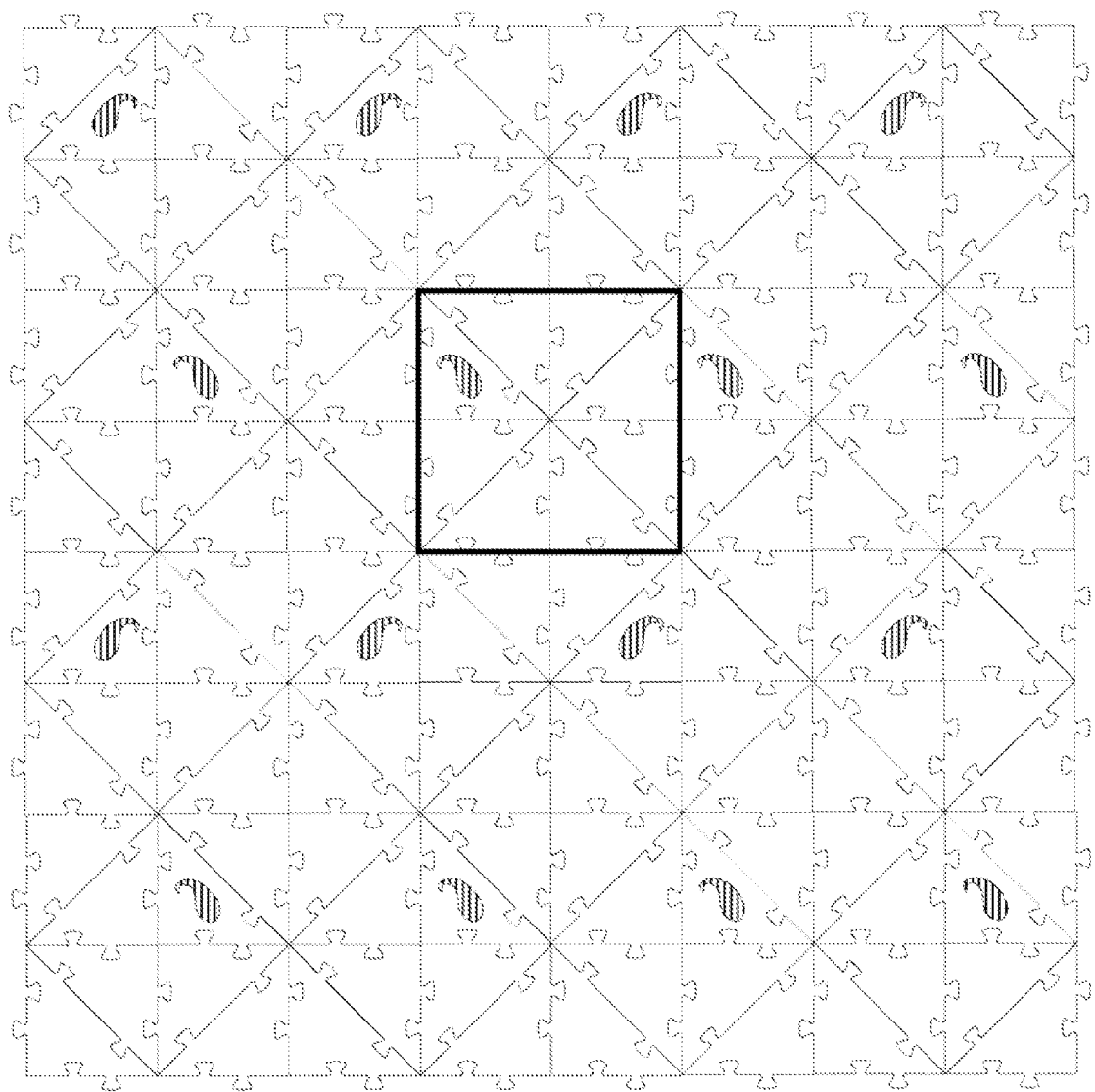

FIG. 22 is a top view of the XX pattern. A fundamental domain is outlined in bold.

Figure 23:
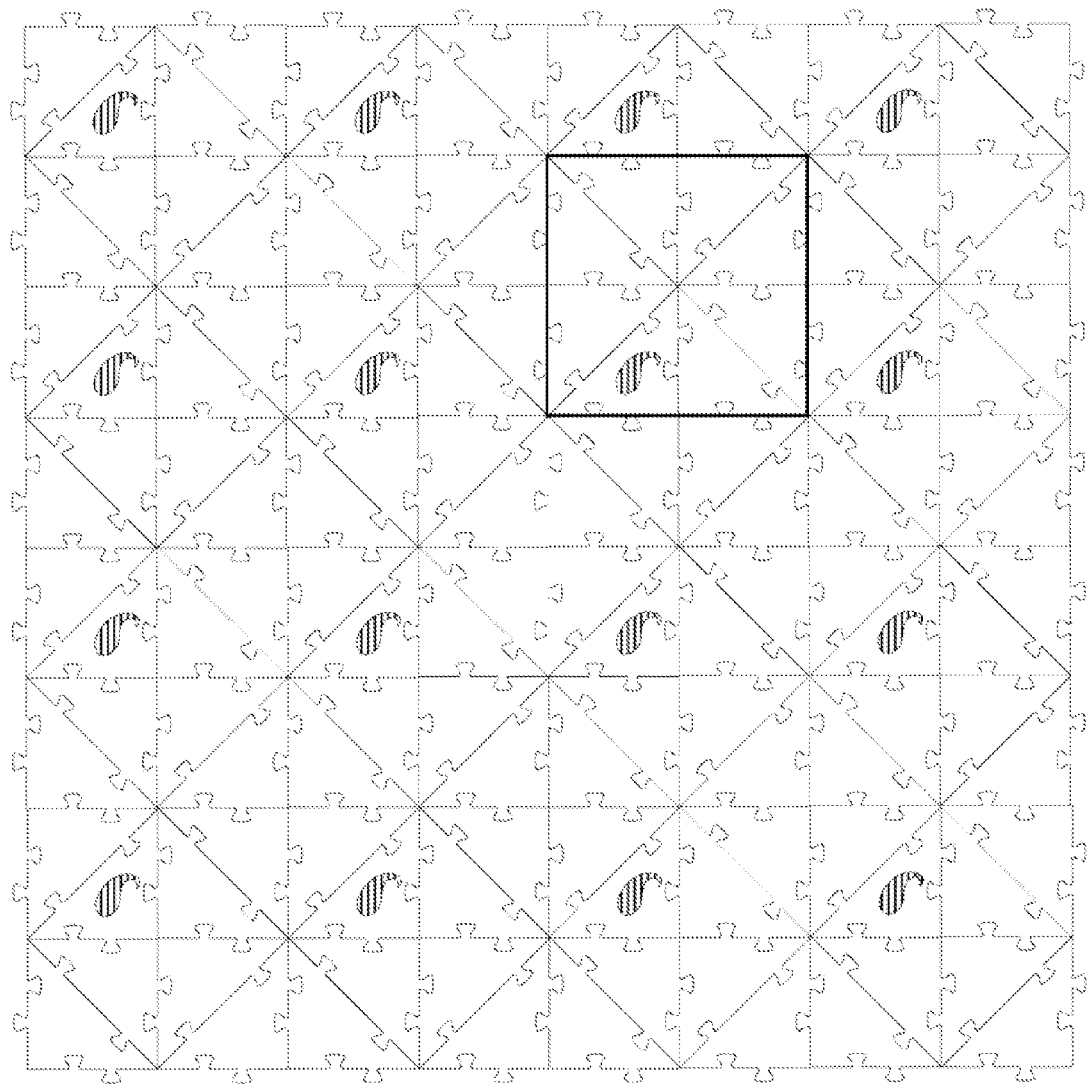

FIG. 23 is a top view of the O pattern. A fundamental domain is outlined in bold.

Figure 24:
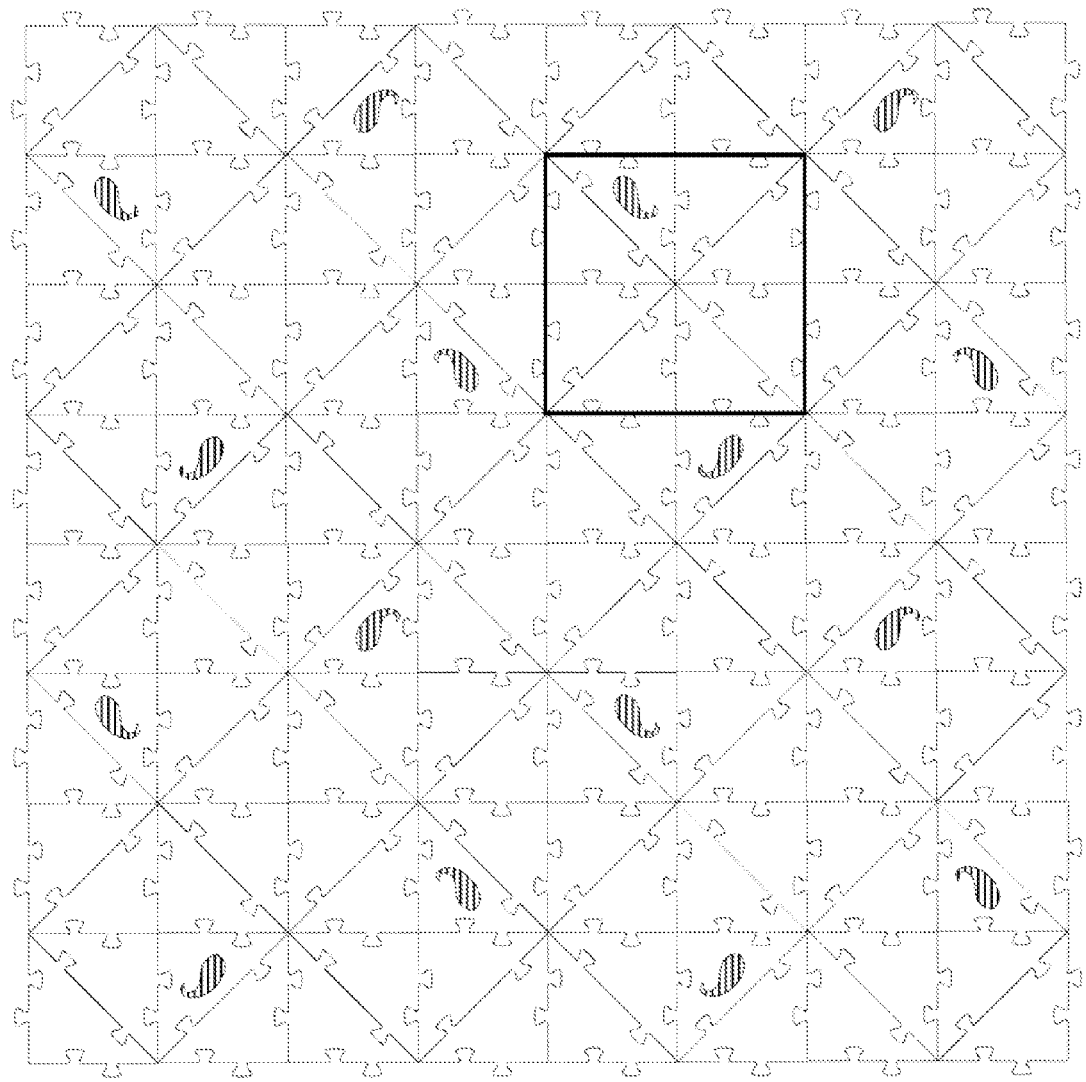

FIG. 24 is a top view of the 22X pattern. A fundamental domain is outlined in bold.

Figure 25:
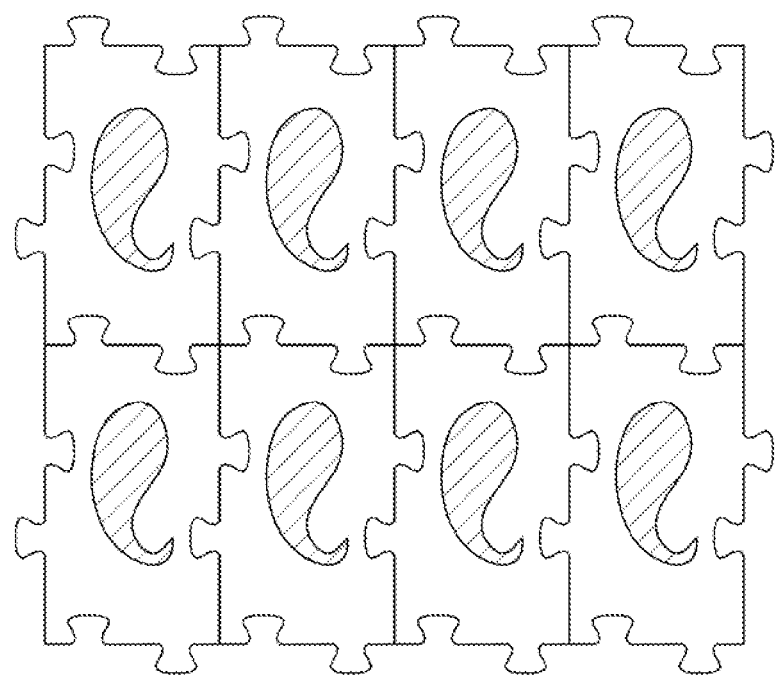

FIG. 25 is a top view of the O pattern made with the rectangular tiles.

Figure 26:
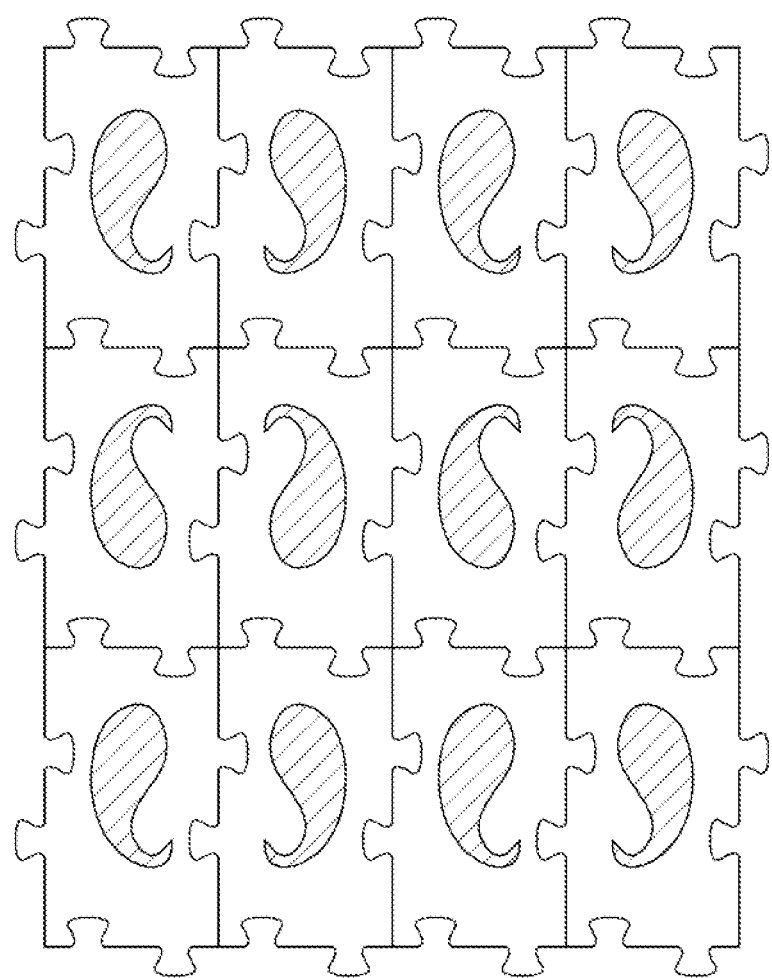

FIG. 26 is a top view of the *2222 pattern made with the rectangular tiles.

Figure 27:
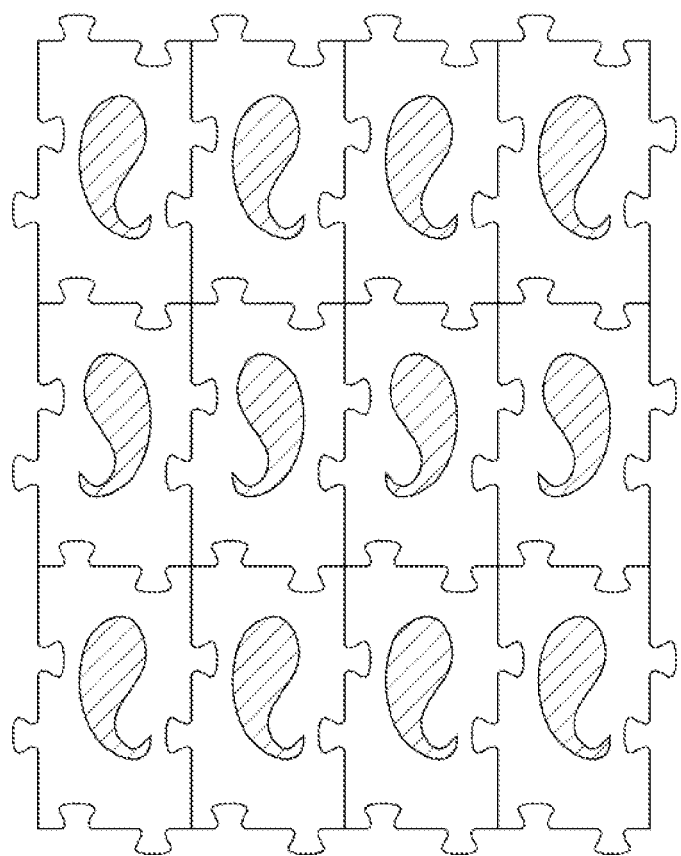

FIG. 27 is a top view of the XX pattern made with the rectangular tiles.

Figure 28:
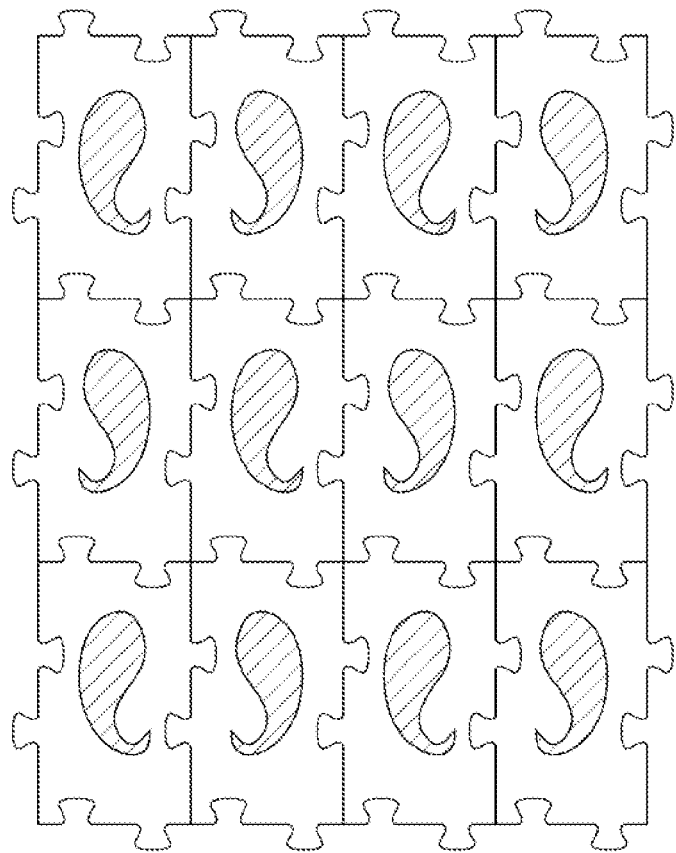

FIG. 28 is a top view of the *X pattern made with the rectangular tiles.

Figure 29:
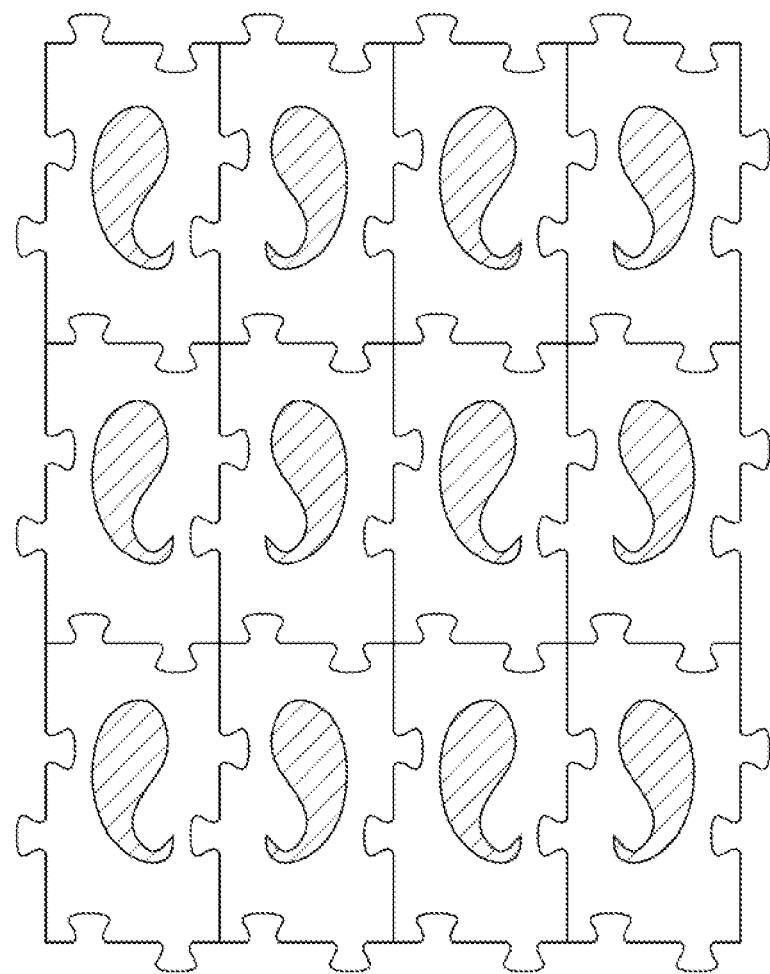

FIG. 29 is a top view of the ** pattern made with the rectangular tiles.

Figure 30:
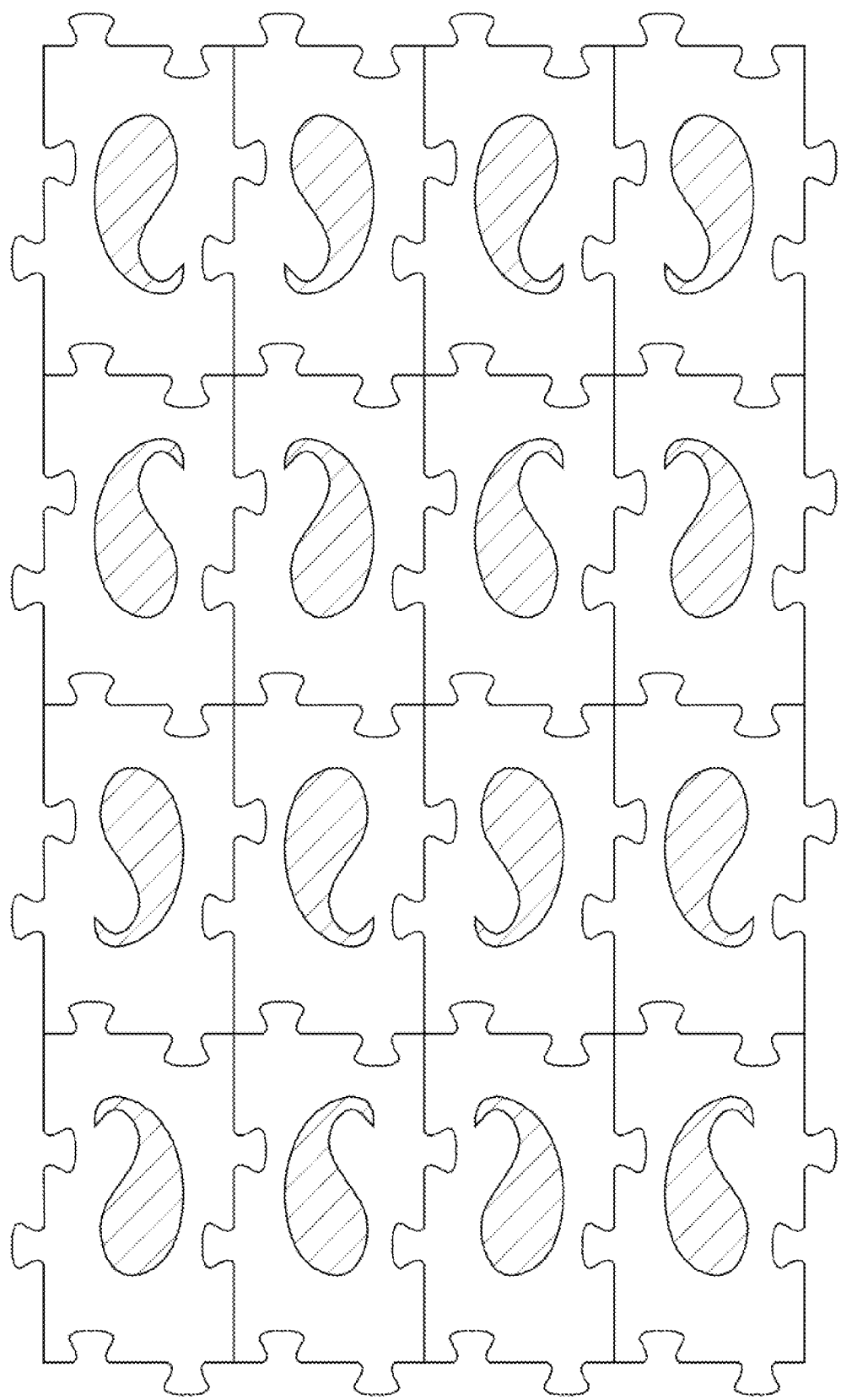

FIG. 30 is a top view of the 2*22 pattern made with the rectangular tiles.

Figure 31:
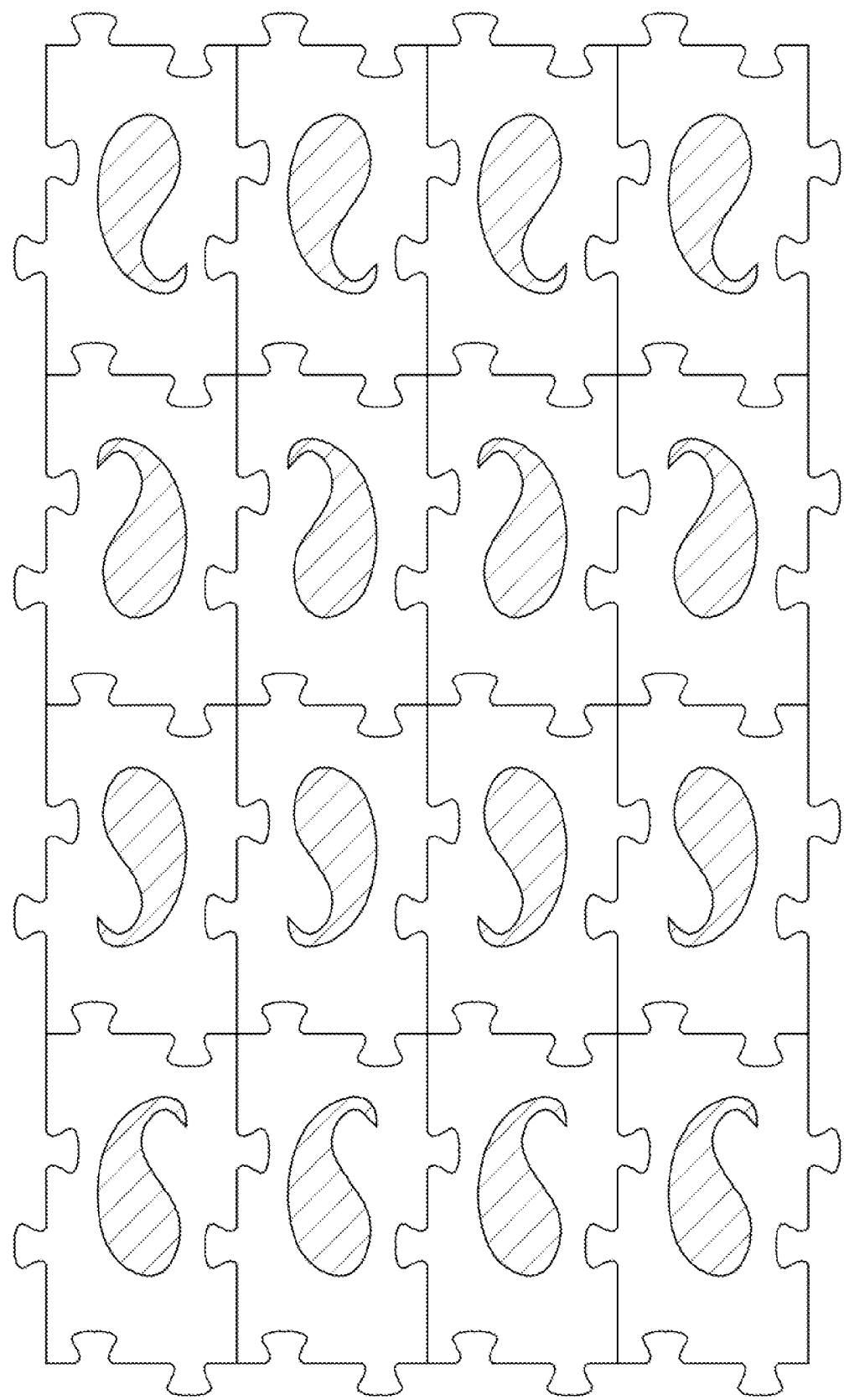

FIG. 31 is a top view of the 22* pattern made with the rectangular tiles.

Figure 32:
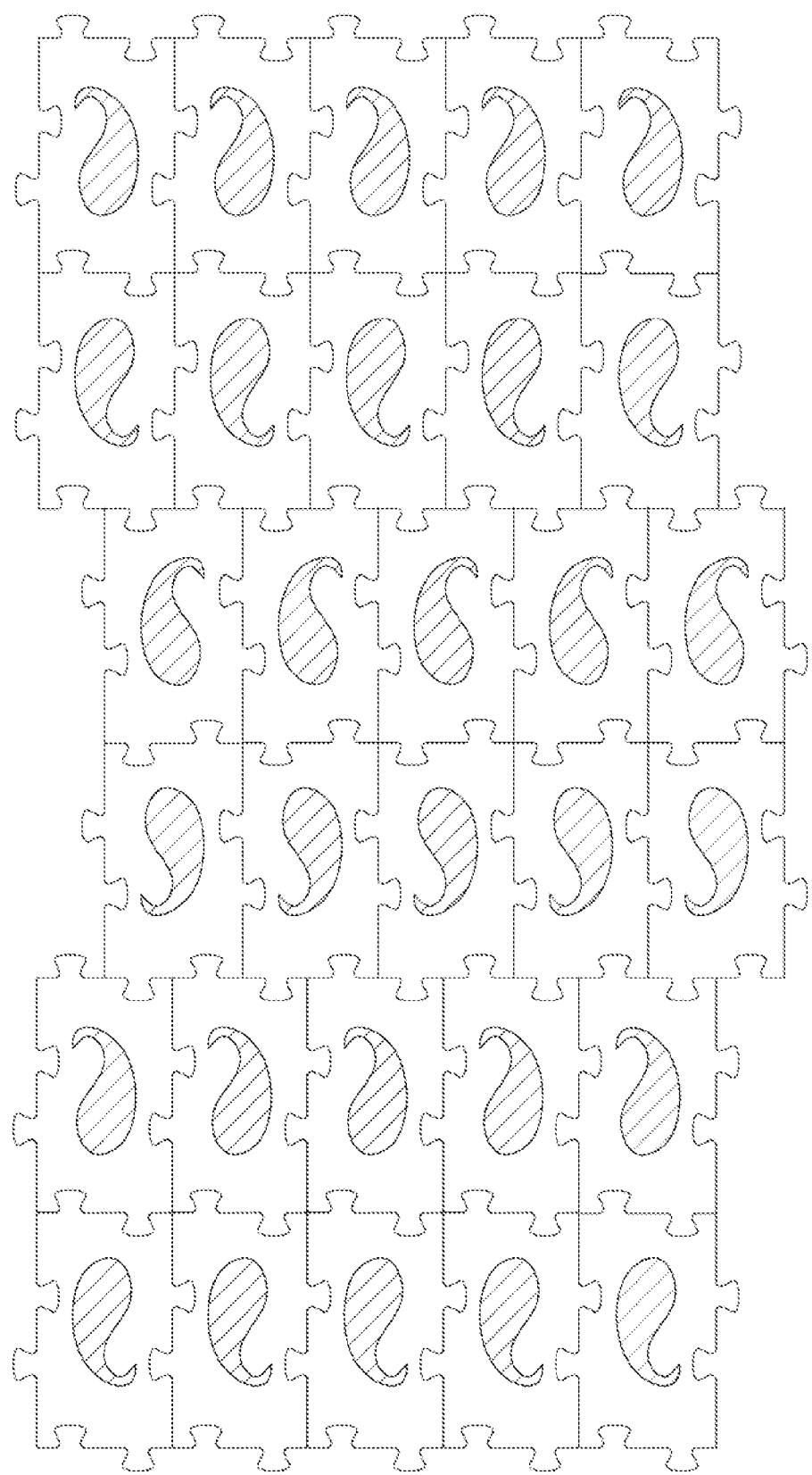

FIG. 32 is a top view of the 22X pattern made with the rectangular tiles.

Figure 33:
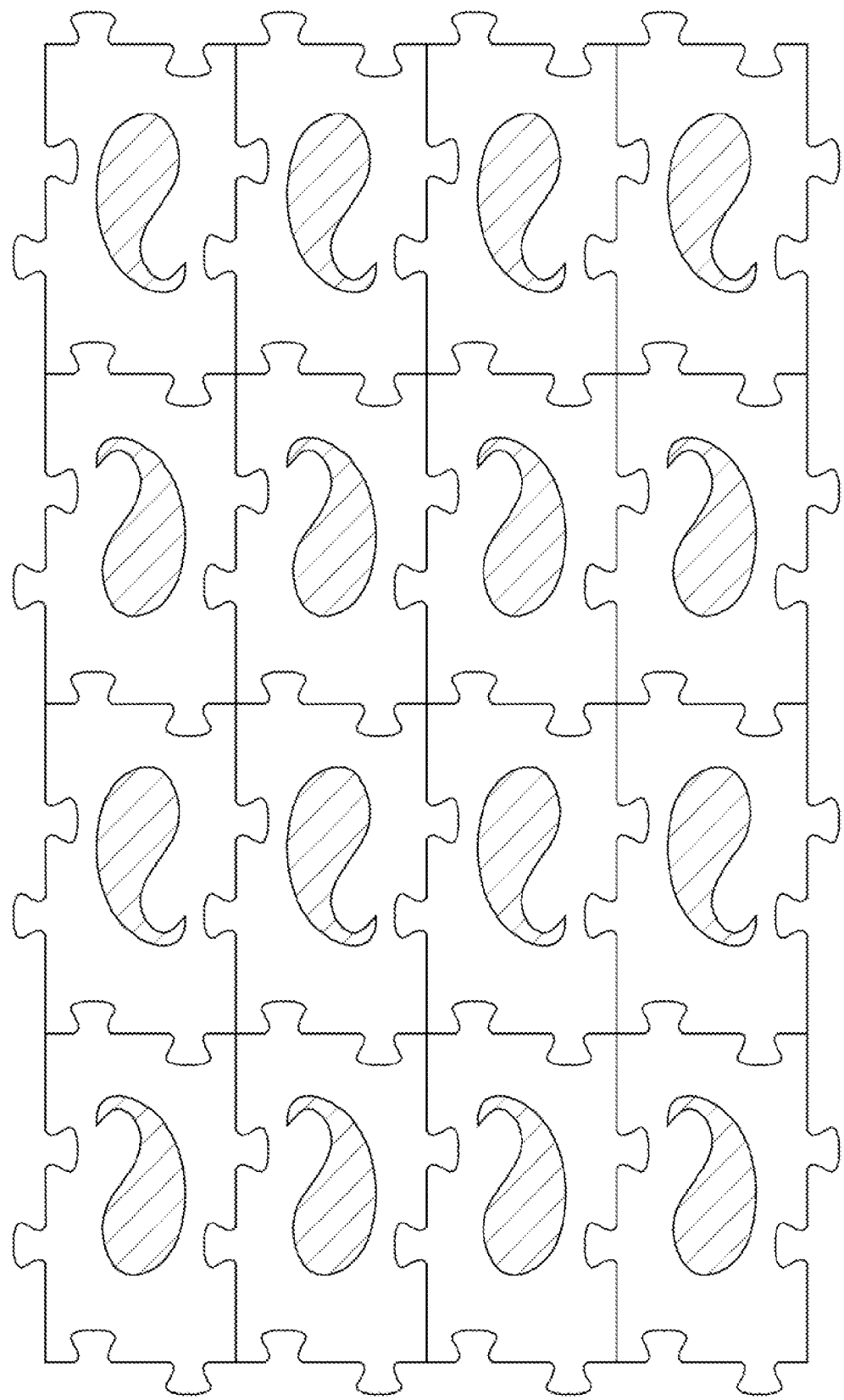

FIG. 33 is a top view of the 2222 pattern made with the rectangular tiles.

Figure 34:
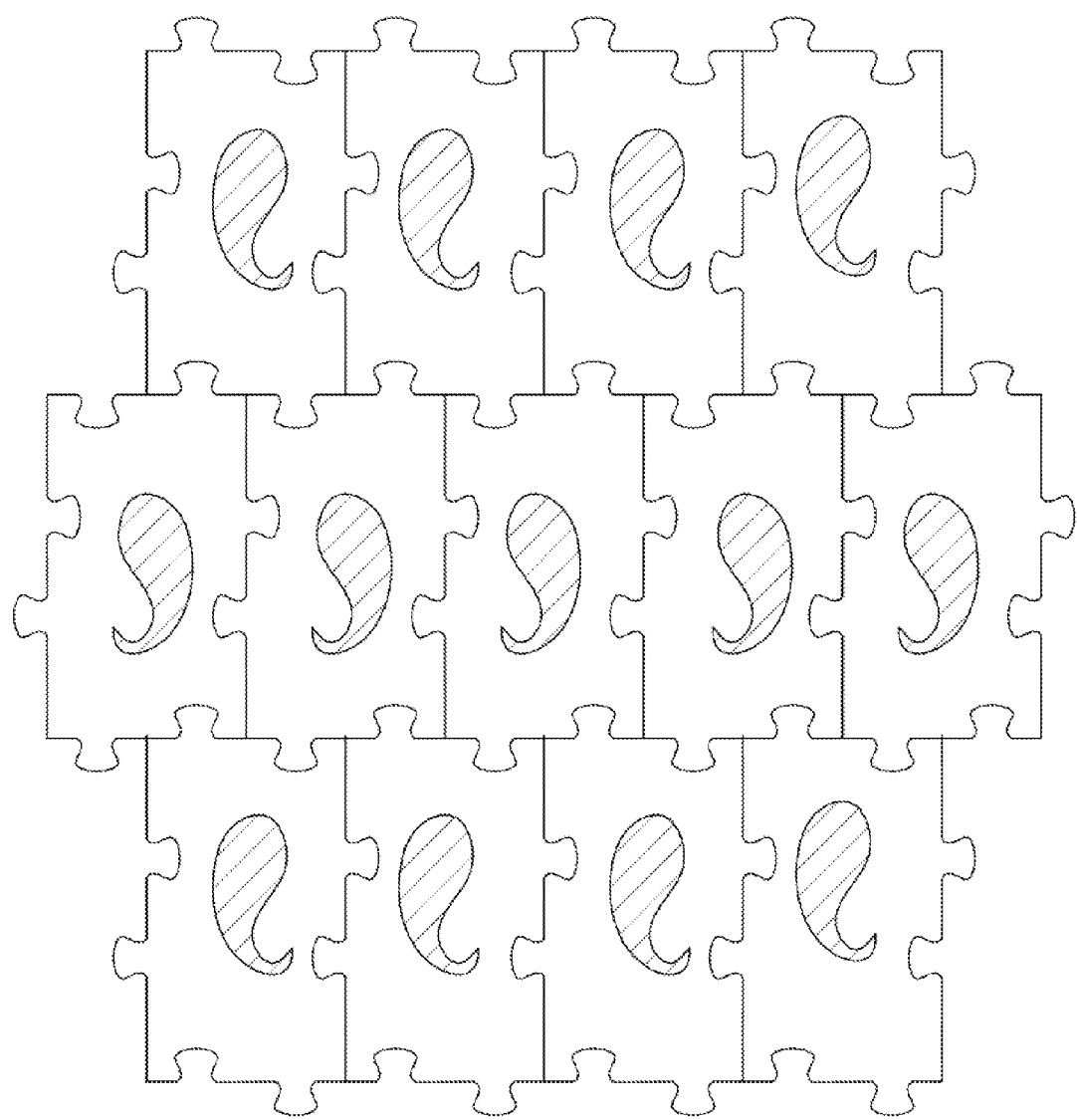

FIG. 34 is a top view of the XX pattern made with the rectangular tiles.

Figure 35:
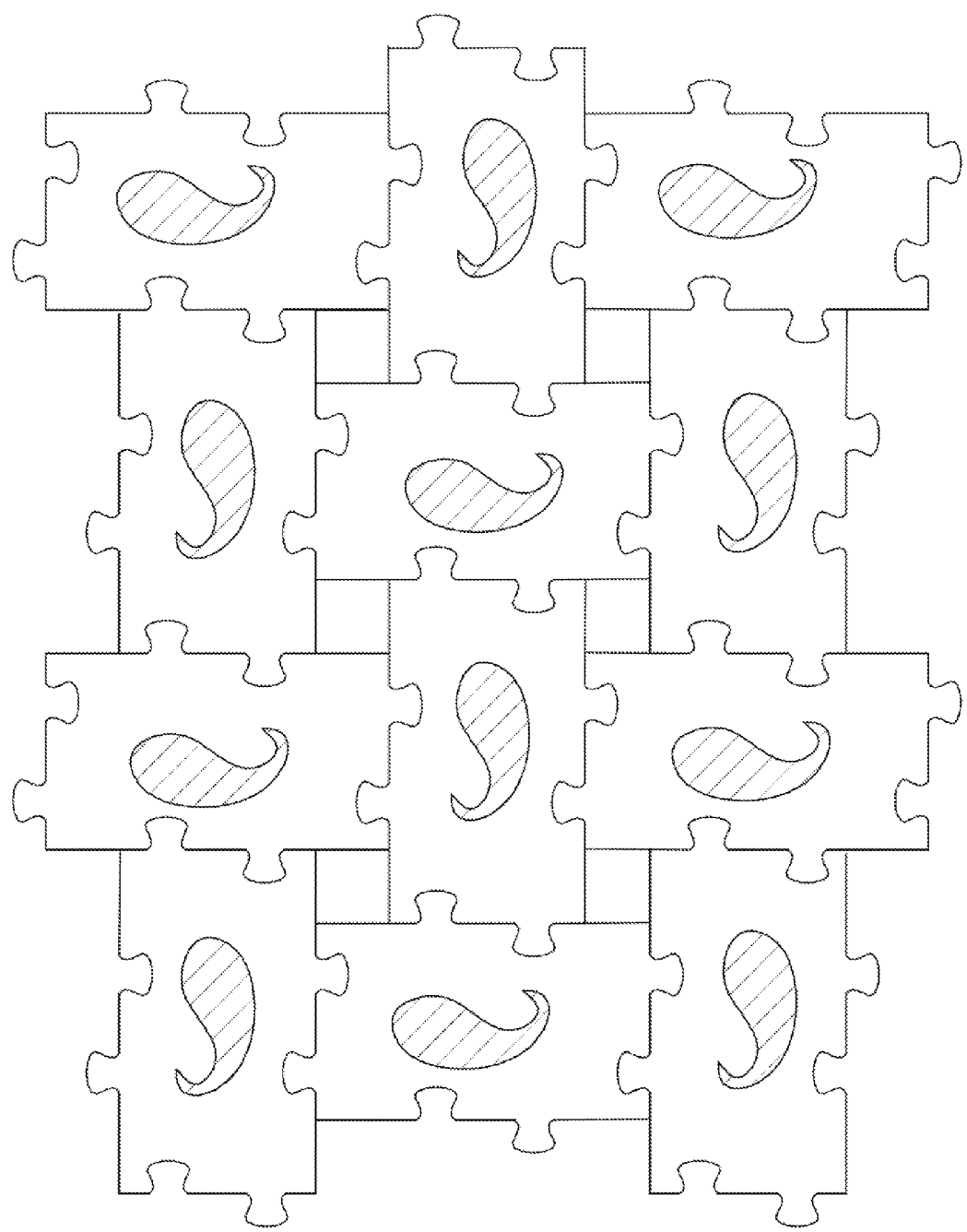

FIG. 35 is a top view of the XX pattern made with the rectangular tiles configured in a different way than in FIG. 34.

Figure 4A:
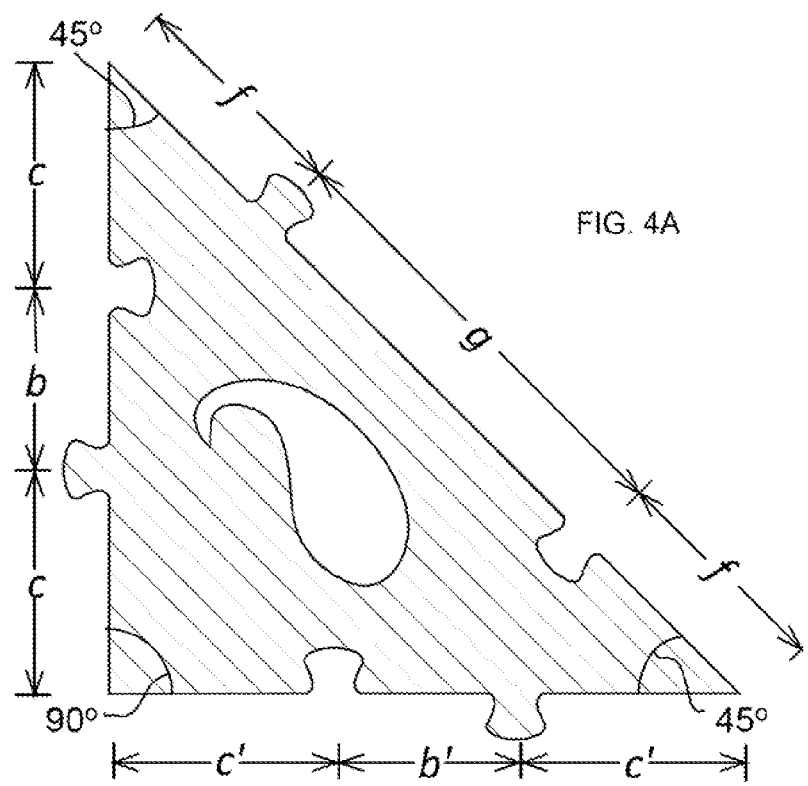
FIGS. 4A and 4B show a top view of the right isosceles triangle tile and its complement.
Figure 4B:
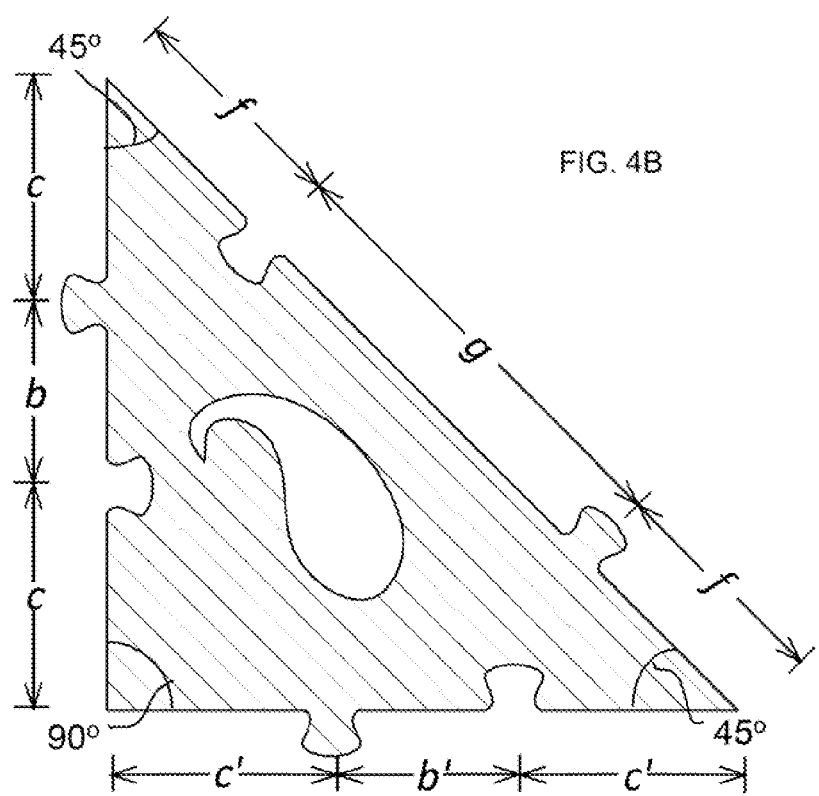
Figure 5:
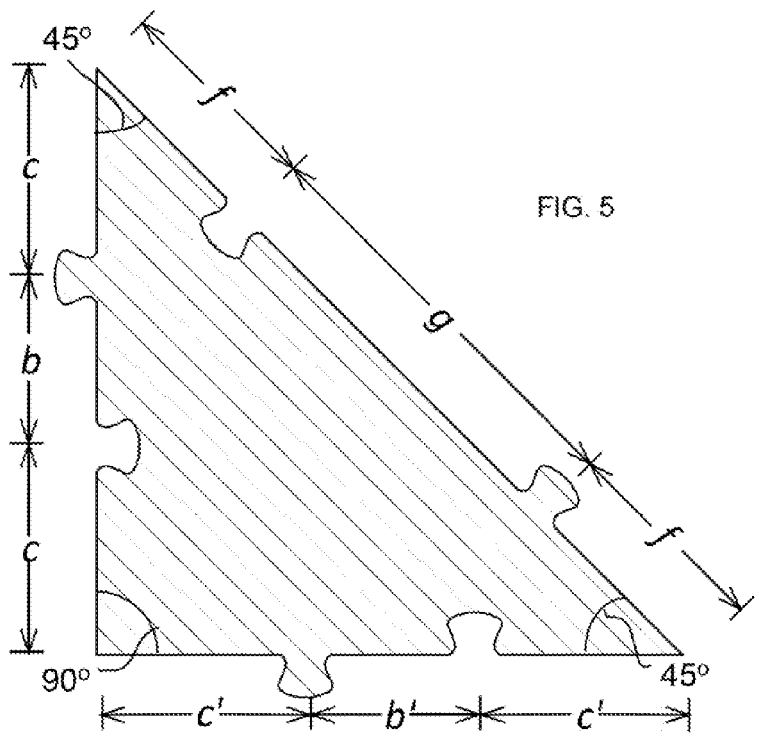
FIG. 5 is a top view of the plain version of the tiles in FIGS. 4A and 4B.
Figure 36:
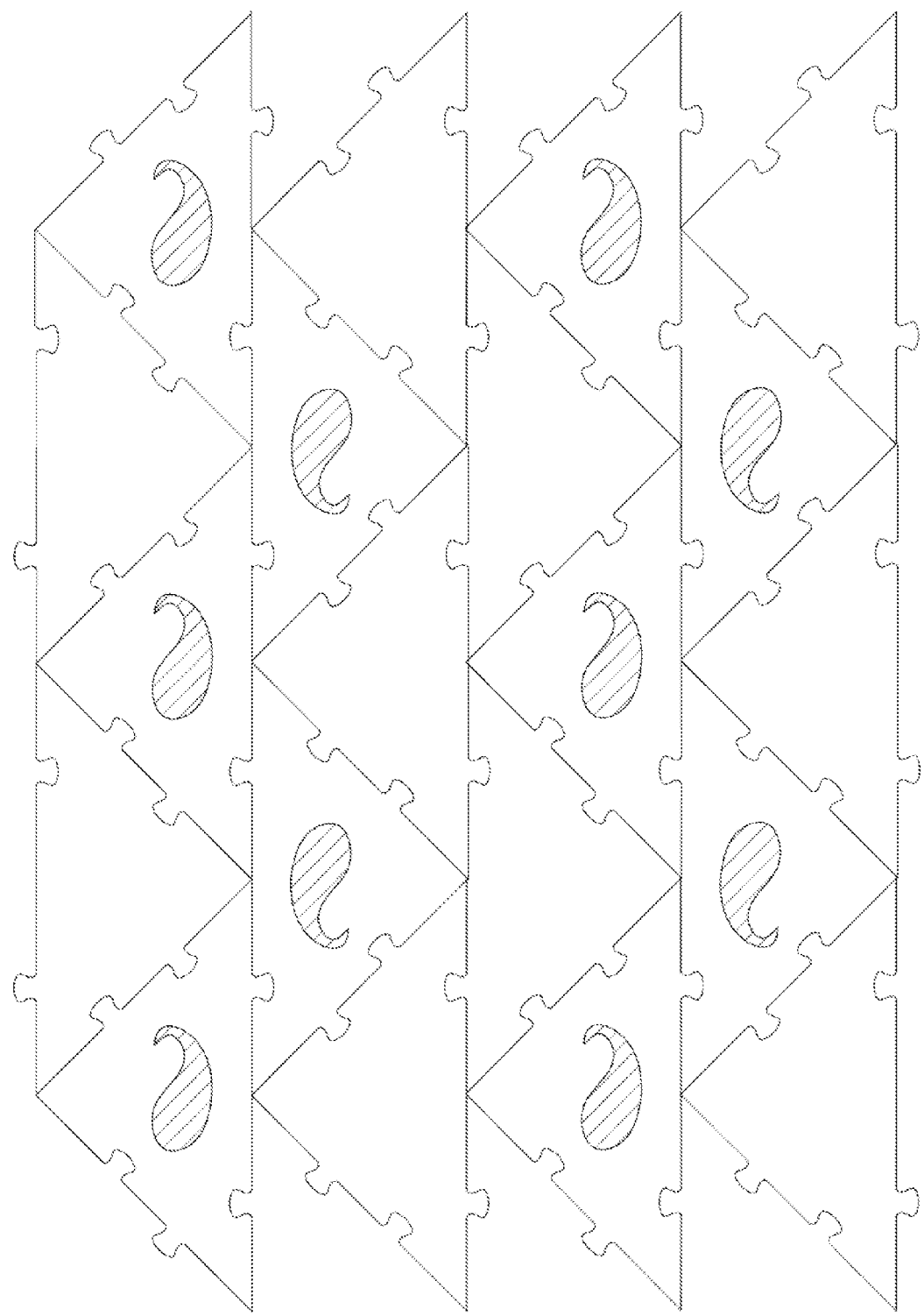

FIG. 36 is a top view of the XX pattern made with the tiles shown in FIGS. 4A, 4B, and 5. This is a different layout of the XX pattern than the one shown in FIGS. 22, 34, and 35.

Figure 6A:
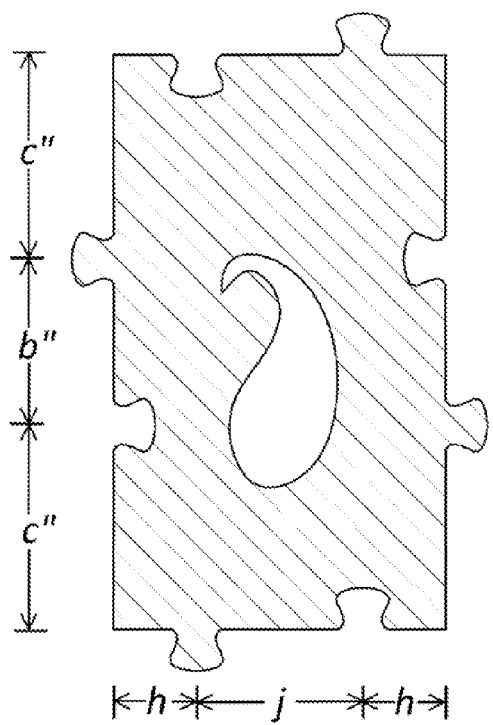
FIGS. 6A and 6B show a top view of the rectangular tile and its complement.
Figure 6B:
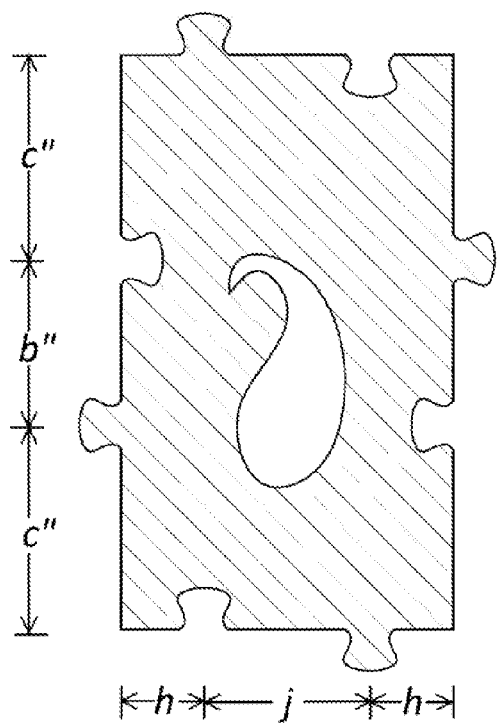

FIGS. 37A, 37B, 37C, and 37D demonstrate the four distinct ways in which the rectangular tiles of FIGS. 6A and 6B can be juxtaposed along their long sides.

FIGS. 38A, 38B, 38C, and 38D illustrate some of some of the ways in which the tiles fit together.

Figure 39A:
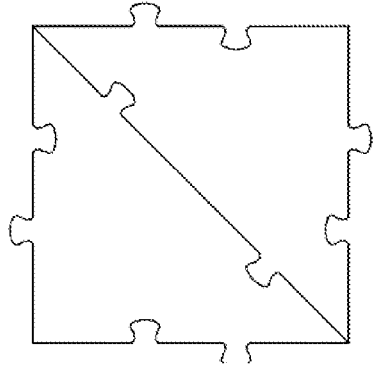
Figure 39B:
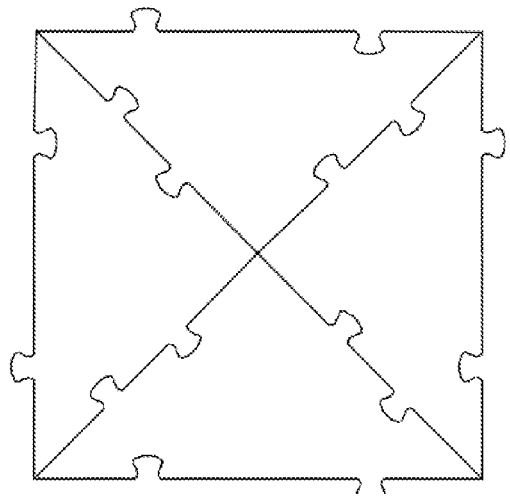

FIGS. 39A and 39B illustrate how tiles in FIG. 5 can be assembled into squares so as to demonstrate the derivation of $\sqrt{2}$.

Figure 3A:
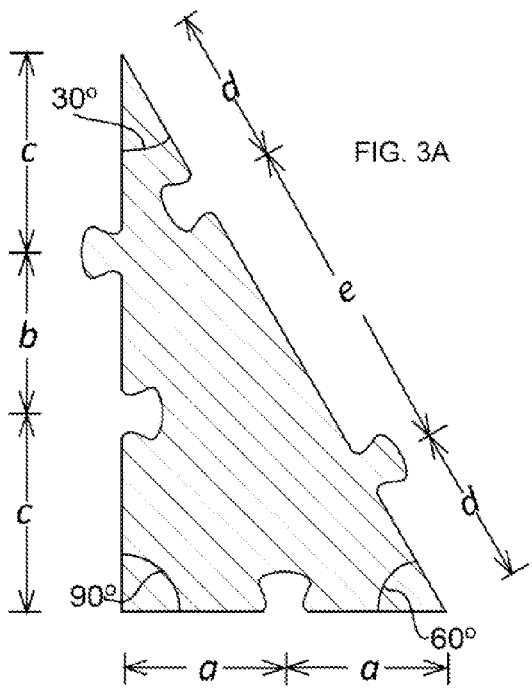
FIG. 3A is a top view of the plain version of the tile in FIG. 2A.
Figure 3B:
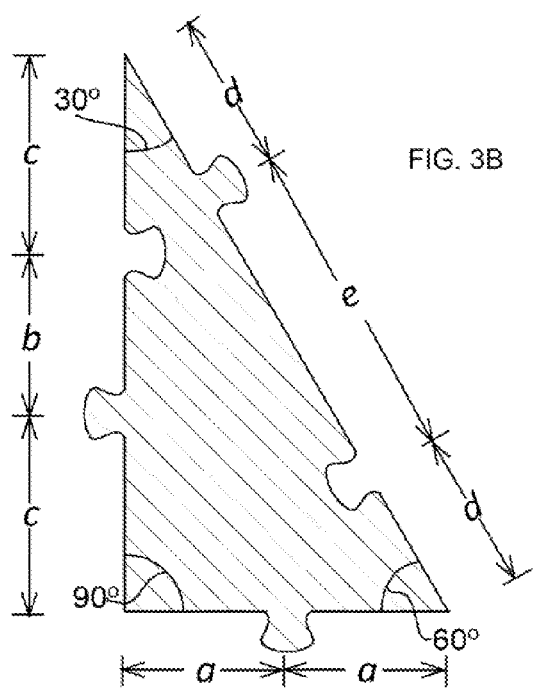
FIG. 3B is a top view of the plain version of the tile in FIG. 2B.

FIGS. 40A, 40B, 40C, and 40D illustrate how the tiles in FIGS. 3A and 3B can be juxtaposed so as to demonstrate the properties of a 30°-60°-90° triangle.

Figures 41A, 41B:
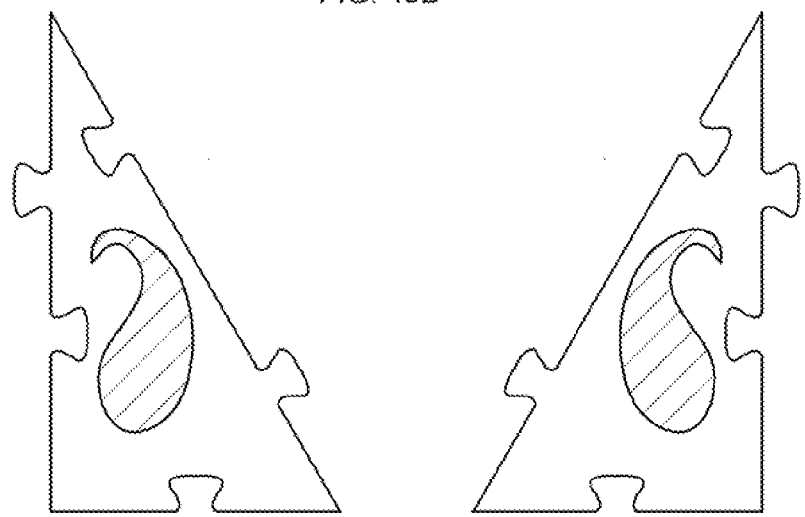

FIGS. 41A and 41B show both sides of an alternative embodiment of a typical puzzle piece. In contrast with the piece depicted in FIG. 1, here the design is printed on both side of each piece, rather than cut out.

FIGS. 42A, 42B, 42C, and 42D show a top view of an alternative embodiment of the 30°-60°-90° triangle tiles that were depicted in FIGS. 2A, 2B, 3A and 3B.

Figure 43A:
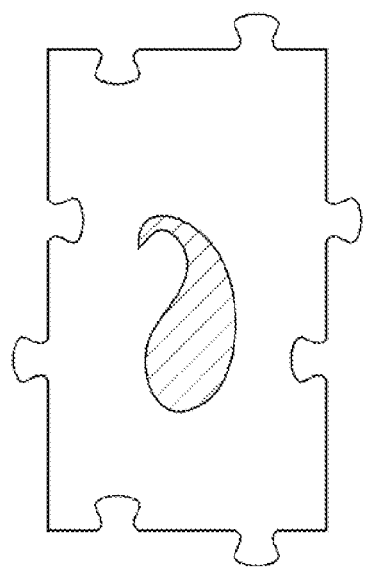
Figure 43B:
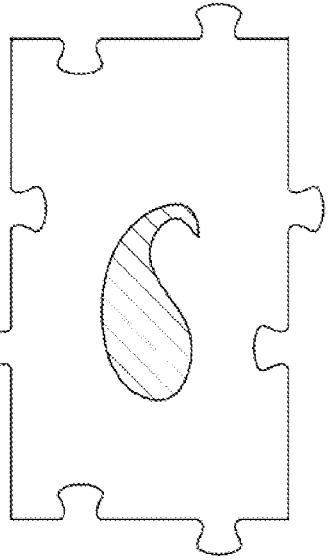

FIGS. 43A and 43B show alternative embodiments of the rectangular tiles in terms of the placement of their male and female coupling elements.

Figure 43C:
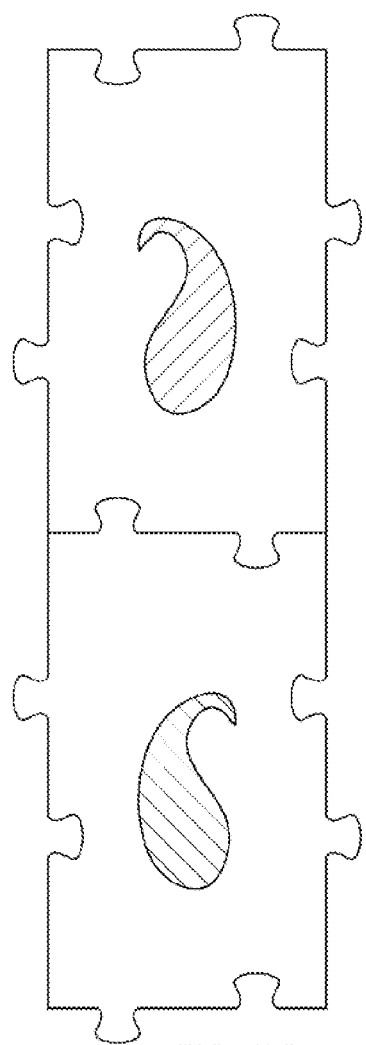

FIG. 43C shows the juxtaposition of two identical tiles pictured in FIGS. 43A.

Figure 44A:
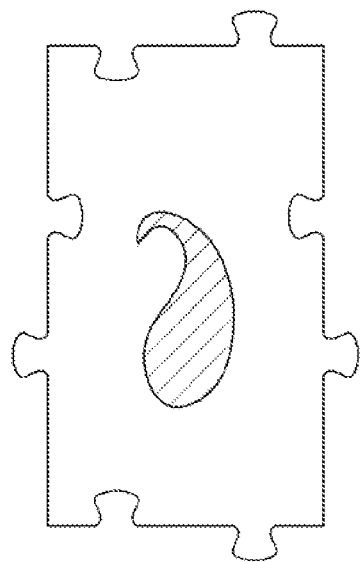
Figure 44B:
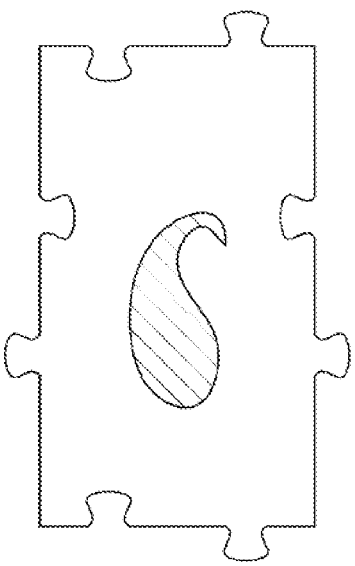

FIGS. 44A and 44B show another alternative embodiment of the rectangular tiles in terms of the placement of their male and female coupling elements.

REFERENCE NUMERALS

50 Stencil aperture
51 Male coupling element
52 Female coupling element

DETAILED DESCRIPTION

Figure 1:
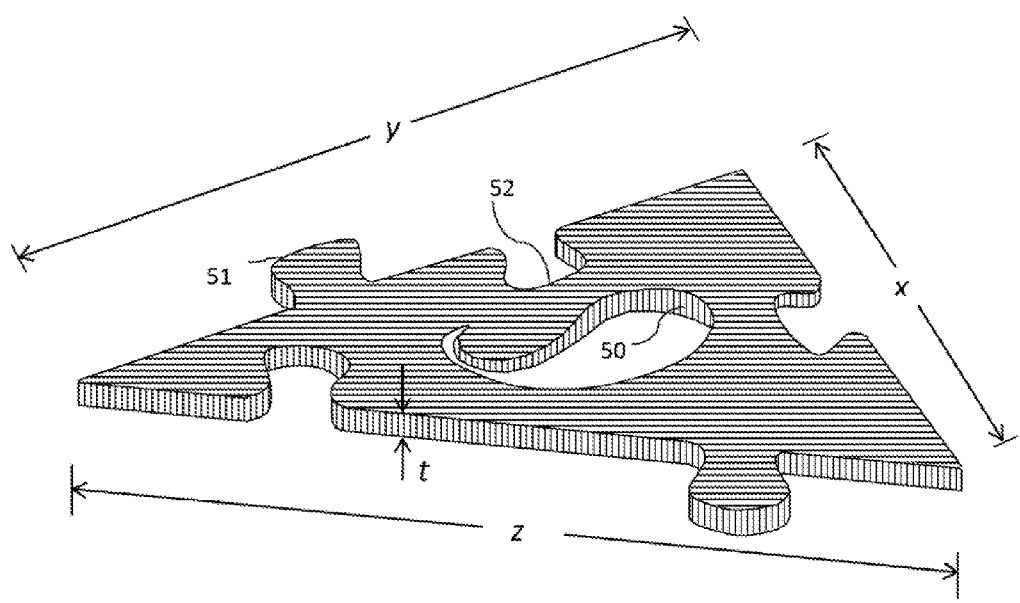
FIG. 1 is a perspective view of a typical tile.

FIG. 1 is an enlarged left perspective view of a single tile. This particular embodiment has an aperture 50 in the shape of a paisley, but any other asymmetrical shape may be used in place of the paisley. The dimensions obey the relationships y=$\sqrt{3}$x and z=2x. The absolute length of the sides x, y, z and its thickness, t, are of sufficient size for the tile to be comfortably used as a stencil by children and adults. The male and female coupling elements can be realized as tongues and recesses, markers, dowel pins and recesses, or other connectors with clearly identifiable male and female elements. In the preferred embodiment, pictured in FIG. 1, tongues and recesses form the male and female coupling elements, respectively. The male 51 and female 52 coupling elements are each symmetric about their respective midlines.

The tiles comprising the invention can be made of acrylic, polycarbonate, other plastics, chipboard, cardboard, glass, foam, wood, or other sufficiently rigid materials. Depending on the materials used and the size and thickness of the tiles, a variety of methods can be used to manufacture the tiles, such as cutting by water jet or laser, stamping with a die or injection molding.

Figure 2A:
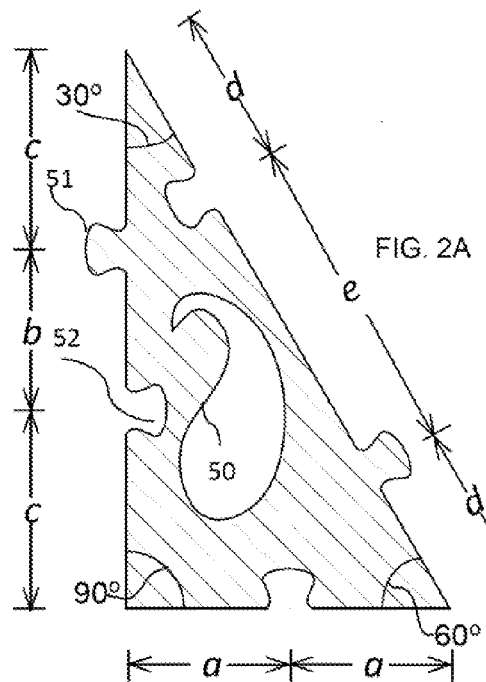
FIG. 2A is a top view of the tile in FIG. 1.
Figure 2B:
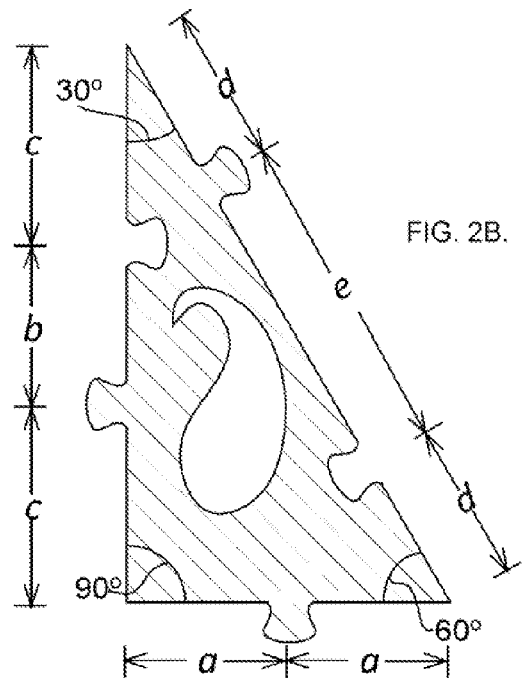
FIG. 2B is a top view tile complementary to the tile in FIG. 2A.

FIG. 2A is a top view of the tile in FIG. 1, and FIG. 2B is its complement. The dimensions in this embodiment of the invention are as follows. a=b=d=x/2, e=x where x was defined in FIG. 1. c is determined by the fact that 2c+b=y. So $$c = \frac{y-b}{2}.$$

FIGS. 3A and 3B depict the plain version of the tiles in FIGS. 2A and 2B, respectively.

FIGS. 4A and 4B depict the right isosceles triangle tile and its complement. 2c'+b'=2c+b=y, where y was defined in FIG. 1. In the preferred embodiment, b'=b, c'=c and g=2f. b and c are the same dimensions as in FIGS. 2A and 2B. Given that the tiles in question are shaped like right isosceles triangles, the length of each hypotenuse must be $\sqrt{2}$ times the length of either side. This translates into the equation $$2f + g = \sqrt{2}\,(2c' + b') = \sqrt{2}\,y.$$

Together with g=2f, this gives f=$\sqrt{2}$y/4 and g=$\sqrt{2}$y/2.

FIG. 5 depicts the plain version of both of the tiles in FIGS. 4A and 4B.

FIGS. 6A and 6B is a top of the rectangular tile and its complement. In the preferred embodiment, b″=b, c″=c, j=b, and h=j/2, with b and c defined in FIGS. 2A and 2B.

FIG. 7 depicts of all the 17 planar periodic patterns based on a motif of a half-apple as the basic unit of repetition. The Conway notation is used to label each pattern.

FIG. 8 is a top view of the pattern denoted as *632 in the Conway notation. The inside of the paisley shape will be shown hatched for clarity. The pattern is assembled using the tiles in FIGS. 2A and 2B. The fundamental domain of the pattern is shown in bold. If we disregard the male and female coupling elements of the tiles, the fundamental domain of this pattern corresponds exactly to a single tile.

FIG. 9 is a top view of the pattern denoted as *333 in the Conway notation. It is assembled using the tiles in FIGS. 2A, 2B, 3A, and 3B. The fundamental domain consists of the two tiles as shown in bold.

FIG. 10 is a top view of the pattern denoted as 3*3 in the Conway notation. It is assembled using the tiles in FIGS. 2A, 2B, 3A, and 3B. This pattern has more than one fundamental domain. The bold outline shows one of these fundamental domains.

FIG. 11 is a top view of the pattern denoted as 632 in the Conway notation. It is assembled using the tiles in FIGS. 2A, 2B, 3A, and 3B. A fundamental domain is shown in bold.

FIG. 12 is a top view of the pattern denoted as 333 in the Conway notation. It is assembled using the tiles in FIGS. 2A, 2B, 3A, and 3B. A fundamental domain is shown in bold.

FIG. 13 is a top view of the pattern denoted as *442 in the Conway notation. It is assembled using the tiles in FIGS. 4A and 4B. The only fundamental domain is shown in bold. *442 the second of the two "parent" patterns. It can be used to construct the patterns *2222, 2*2, 4*2, and 442. This is accomplished by systematically replacing groups of tiles with identically shaped plain tiles.

FIG. 14 is a top view of the pattern denoted as 4*2 in the Conway notation. It is assembled using the tiles in FIGS. 4A, 4B, and 5. A fundamental domain is shown in bold.

FIG. 15 is a top view of the pattern denoted as *2222 in the Conway notation. It is assembled using the tiles in FIGS. 4A, 4B, and 5. The fundamental domain is shown in bold. The rest of the patterns, 2222, 22*, 22X, **, *X, XX, O can be derived from *2222 by replacing some of the patterned tiles with identically shaped plain tiles.

FIG. 16 is a top view of the pattern denoted as 2*22 in the Conway notation. It is assembled using the tiles in FIGS. 4A, 4B, and 5. A fundamental domain is shown in bold.

FIG. 17 is a top view of the pattern denoted as 442 in the Conway notation. It is assembled using the tiles in FIGS. 4A, 4B, and 5. A fundamental domain is shown in bold.

FIG. 18 is a top view of the pattern denoted as 2222 in the Conway notation. It is assembled using the tiles in FIGS. 4A, 4B, and 5. A fundamental domain is shown in bold.

FIG. 19 is a top view of the pattern denoted as 22* in the Conway notation. It is assembled using the tiles in FIGS. 4A, 4B, and 5. A fundamental domain is shown in bold.

FIG. 20 is a top view of the pattern denoted as ** in the Conway notation. It is assembled using the tiles in FIGS. 4A, 4B, and 5. A fundamental domain is shown in bold.

FIG. 21 is a top view of the pattern denoted as *X in the Conway notation. It is assembled using the tiles in FIGS. 4A, 4B, and 5. A fundamental domain is shown in bold.

FIG. 22 is a top view of the pattern denoted as XX in the Conway notation. It is assembled using the tiles in FIGS. 4A, 4B, and 5. A fundamental domain is shown in bold.

FIG. 23 is a top view of the pattern denoted as O in the Conway notation. It is assembled using the tiles in FIGS. 4A, 4B, and 5. A fundamental domain is shown in bold.

FIG. 24 is a top view of the pattern denoted as 22X in the Conway notation. It is assembled using the tiles in FIGS. 4A, 4B, and 5. A fundamental domain is shown in bold.

FIG. 25 is a top view of the O pattern made with the rectangular tiles in FIG. 6B. This is a different way of making the pattern than the one shown in FIG. 23.

FIG. 26 is a top view of the *2222 pattern made with the rectangular tiles in FIGS. 6A and 6B.

FIG. 27 is a top view of the XX pattern made with the rectangular tiles in FIGS. 6A and 6B.

FIG. 28 is a top view of the *X pattern made with the rectangular tiles in FIGS. 6A and 6B.

FIG. 29 is a top view of the ** pattern made with the rectangular tiles in FIGS. 6A and 6B.

FIG. 30 is a top view of the 2*22 pattern made with the rectangular tiles in FIGS. 6A and 6B.

FIG. 31 is a top view of the 22* pattern made with the rectangular tiles in FIGS. 6A and 6B.

FIG. 32 is a top view of the 22X pattern made with the rectangular tiles in FIGS. 6A and 6B.

FIG. 33 is a top view of the 2222 pattern made with the rectangular tiles in FIG. 6B.

FIG. 34 is a top view of the XX pattern made with the rectangular tiles in FIG. 6B.

FIG. 35 is a top view of the pattern denoted as XX in the Conway notation. In contrast with the XX pattern shown in FIG. 27, here the pattern is assembled entirely of the tiles in FIG. 6A. Although the patterns in FIGS. 27 and 35 do not appear to be identical, they are considered to be the "same" from a mathematical point of view. That is because they have the same group of symmetry.

FIG. 36 shows how the tiles in FIGS. 4A, 4B, and 5 can be juxtaposed to make the XX pattern. A different arrangement of these tiles to make the XX pattern was already shown in FIGS. 27, 34, and 35. In this configuration, the tiles are staggered with respect to each other, utilizing the placement of the male and female coupling elements along the hypotenuse of the triangular tiles in the preferred embodiment.

Figure 37A:
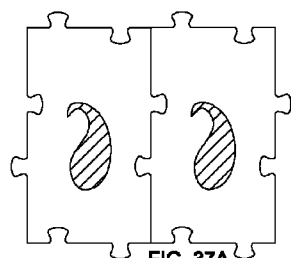
Figure 37B:
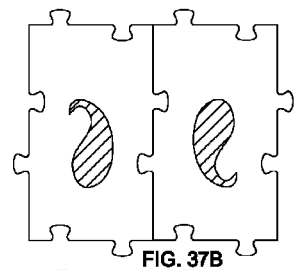
Figure 37C:
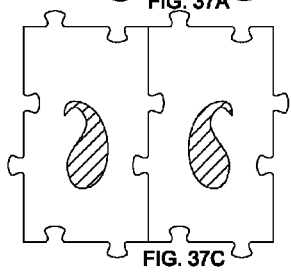
Figure 37D:
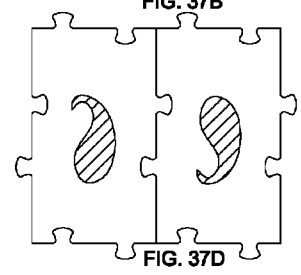

FIGS. 37A, 37B, 37C, and 37D illustrate how the invention can be used to teach students translation, gyration, reflection, and glide reflection. In FIG. 37A one gets from one tile to the other by horizontally translating. In FIG. 37B, one rotates, or gyrates, about the midpoint of the line joining the tiles to get from one tile to the other. Both translation and rotation are orientation preserving transformations, in the sense that they transform an image without mirror-reflecting it. This property is embedded in the invention in the following way. The user can perform all the orientation preserving transformations with just one type of tile; that is, without using the complement of the tile. However, if the user wants to perform an orientation reversing transformation, such as a reflection about an axis (FIG. 37C) or a glide reflection along an axis (FIG. 37D), he will need to use both the tile and its complement.

Figure 38A:
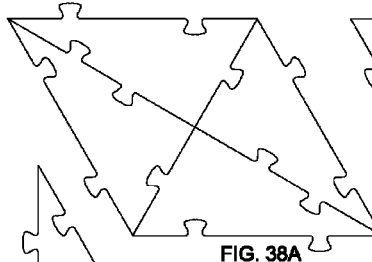
Figure 38B:
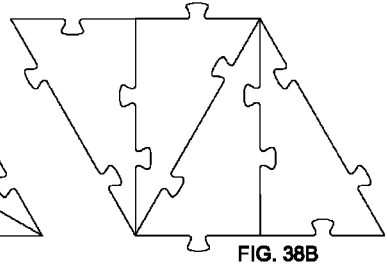
Figure 38C:
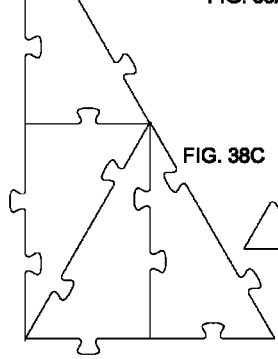
Figure 38D:
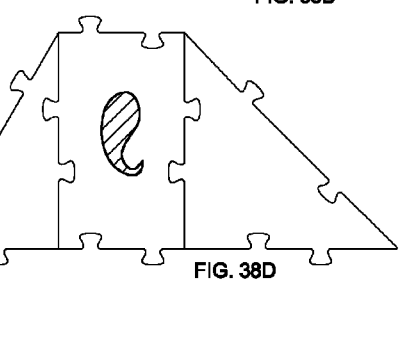

FIGS. 38A and 38B show two different ways in which a rhombus may be made with two pairs of complementary triangles pictured in FIGS. 3A and 3B. FIG. 38C shows how the same two pairs of complementary triangles can be rearranged to form a larger 30°-60°-90° triangle. FIG. 38D illustrates how a variety of tile shapes can be combined to form a trapezoid.

FIG. 39A shows how two tiles pictured in FIG. 5 fit together to form a square. The square shown in FIG. 39B obviously has area equal to twice that of the square in FIG. 39A. Therefore, if we assume, for simplicity, that the area of the square in FIG. 39A is 1 unit, then the area of the square in FIG. 39B is 2 units. It follows that the side length of the square in FIG. 39B is a number whose square is equal to 2, in other words, $\sqrt{2}$. By going through this reasoning, the student can "discover" the concept of the square root.

Figure 40A:
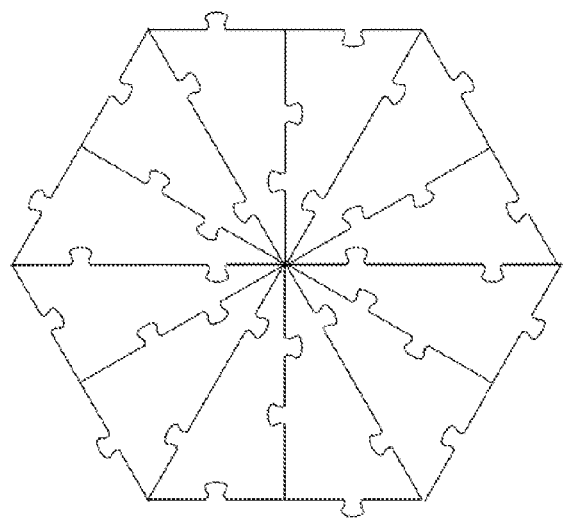
Figure 40B:
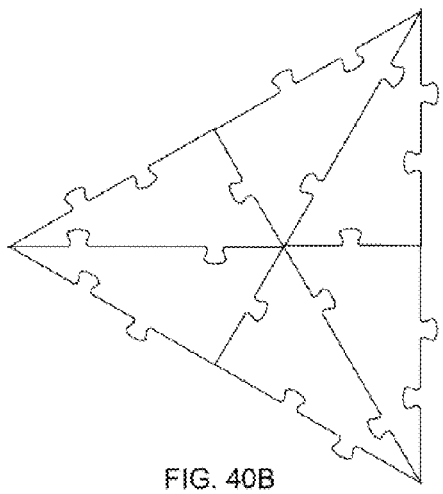
Figure 40C:
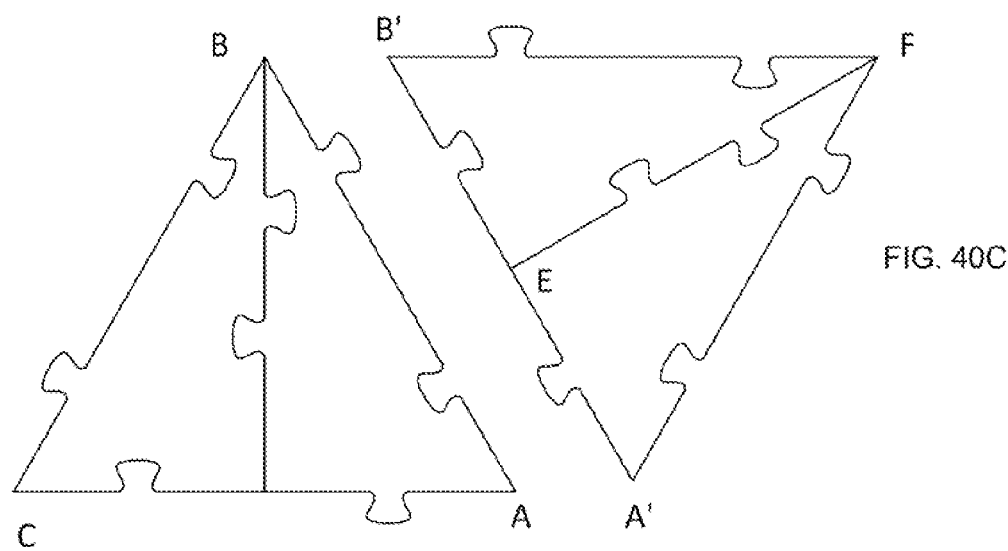
Figure 40D:
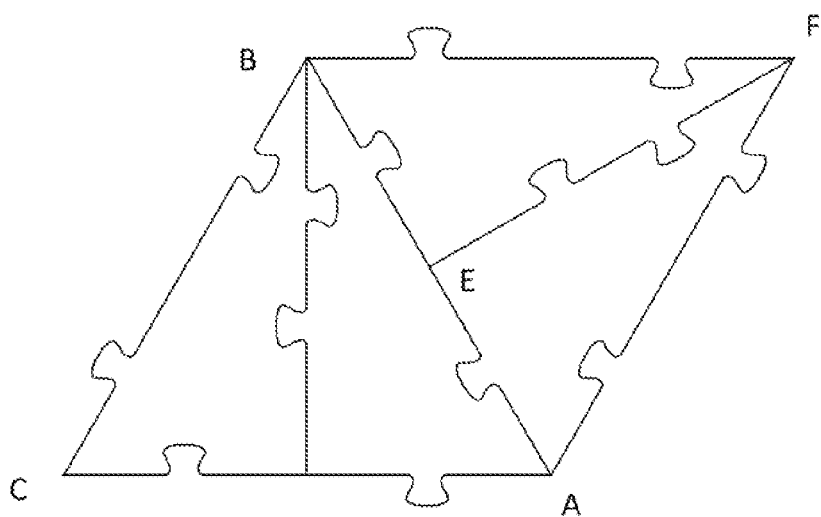

FIGS. 40A, 40B, 40C, and 40D form a sequence of figures that show how a student can be guided to "discover" the 30°-60°-90° triangle and its properties. This triangle is extremely important in the study of trigonometry. The only prior knowledge required is that the full revolution around any vertex spans 360°. By juxtaposing the tiles in FIGS. 3A and 3B as shown in FIG. 40A, the student discovers that 12 of the smaller angles in the triangle make 360°. Therefore, the smaller angle must equal 360°/12=30°. Similarly, the construction in FIG. 9B demonstrates that the larger angle of the triangle must equal 360°/6=60°. Consequently, the student finds that two 30°-60°-90° triangles can be assembled to make an equilateral triangle. FIGS. 40C and 40D illustrate the fact that the shortest side of the 30°-60°-90° triangle has length that is half of the length of its hypotenuse. First, the user can verify that segments B'E and EA' have equal length by stacking the triangles EFB' and EFA'. Then the user discovers that the segments AB and A'B' have the same lengths since the tiles fit together as shown in FIG. 40D. Therefore, the length of EA' is half of the length of AB. Since the length of AB is the same as the length of A'F, EA' is also half of the length of A'F.

FIGS. 41A-45B—Alternative Embodiments.

FIGS. 41A and 41B show the front and back side of a version of the invention without the stencil capacity. Instead of being a cutout, as in FIG. 1, the design is printed or drawn on both sides of the tile.

FIGS. 42A, 42B, 42C, and 42D show an alternative embodiment of the tiles shown in FIGS. 2A, 2B, 3A, and 3B, using the same dimensions a and b as earlier.

FIGS. 43A and 43B show an alternative embodiment of the rectangular tiles shown in FIGS. 6A and 6B. When the user starts out with a stack of two tiles from FIG. 43A and then juxtaposes them as pictured in FIG. 43C, he physically performs a glide reflection. Thus, the tiles in FIGS. 43A and 43B are an aid for kinetic learning of the concept of glide reflection. Unlike the case in FIG. 40D, here a glide reflection can be demonstrated using the same type of tile (as opposed to a tile and its complement).

FIGS. 44A and 44B show a second embodiment of the rectangular tiles shown in FIGS. 6A and 6B. In this embodiment, each tile mates with a glide reflected version of itself, where the gliding can be parallel to either side of the rectangle.

Operation

There is no single correct way to use this invention. In fact, one of the main purposes of the invention is for the user to explore the different ways of combining the tiles on his or her own. The male and female coupling elements of the tiles have been designed so as to provide clues for the user to engage in tile placements in a structured way. While there are no hard and fast rules of operation, some suggestions on how to use the invention effectively are outlined below.

Suggested Use, Version 1.

In this method of operation the user is guided to discover the various types of patterns he or she can make with the tiles while noting the relationships these patterns have with one another. While there is no mathematical prerequisite for seeing these relationships, the user schooled in abstract algebra will recognize the fact that the patterns derived from the "parent" pattern have symmetry groups that are subgroups of the symmetry group of the "parent" pattern. Following the steps below, the user can construct the complete set of 17 plane periodic patterns.

First, one starts with *632 as the "parent" pattern.

Step 1: The user is only permitted to work only with the tiles in FIGS. 2A and 2B. He is given an equal number of tiles of each type. He is asked to create a pattern such that each tile is adjacent to its complementary tile. The user will eventually come up with the pattern *632, shown in FIG. 8.

Step 2: The user is given an option of creating a pattern with a design and its mirror image or one without the mirror image. In the latter case, the simplest thing to do is to replace all the tiles that are identical to each other with the corresponding plain tiles. This results in the 632 pattern, as shown in FIG. 11. In the former case, the user can do one of two things. If he replaces every other equilateral triangle made of 2 tiles with a plain one (so that each 2-tile equilateral triangle with a design is surrounded by 3 plain equilateral triangles), he will obtain 3*3 (FIG. 10). On the other hand, if he replaces every other equilateral triangle made of 6 tiles with a plain one, he will obtain *333 (FIG. 9).

Step 3: Now the user is asked to take either 3*3 or *333 and replace all the tiles that are identical to each other with plain tiles. This will result in the pattern 333 (FIG. 12).

Now one starts with *442 as the "parent" pattern.

Step 4: Restrict the user to working only with the types of tiles in FIGS. 4A and 4B. He is to make a pattern such that each tile is adjacent to its complementary tile. The user will eventually come up with the pattern *442, shown in FIG. 13.

Step 5: The user is given an option of creating a pattern with a design and its mirror image or one without the mirror image. In the latter case, the simplest thing to do is to replace all the tiles that are identical to each other with the plain tiles in FIG. 5. This results in the 442 pattern (FIG. 17). In the former case, the user can do one of three things. The first option is to replace every other 4-tile square with one made of plain tiles. This will result in *2222 (FIG. 15). The second option is to replace every other 2-tile isosceles triangle with one made of plain tiles. This will give 4*2 (FIG. 14). The last option is for the user can replace every other 2-tile square with a blank one. This will result in 2*22, shown in FIG. 16.

Step 6: Starting with *2222, the user is asked to continue replacing patterned tiles with plain ones in the same vein as in Step 5. He will eventually come up with the remainder of the patterns: 2222, 22*, **, *X, XX, O, and 22X (FIGS. 18-24, respectively).

Stencil feature: At any point in the series of steps described above, the user is free to trace the pattern using the stencil capability of each tile. This can serve several purposes:
 1. Each user can keep a record of his work, and subsequently compare the patterns she obtained with those of other users.
 2. After tracing the pattern, the user Can color it in 2, 3, or any prime number of colors to obtain new patterns. This topic is covered in (Conway, Burgiel, & Goodman-Strauss, The Symmetries of Things, 2008, pp. 135-169).

Suggested Use, Version 2.

In contrast with version 1, here the user starts out with fewer types of tiles and gradually increases the number of tiles available to her. This process guides her to discover the various features of the patterns and seeing how these features form an integral part of the Conway notation in (Conway, Burgiel, & Goodman-Strauss, 2008, pp. 15-49). This version provides another way to guide the user to construct the set of 17 plane periodic patterns.

Step 1: To begin with, the user is permitted to work only with the rectangular tiles shown in FIG. 6B.
 (a) She is asked to make all possible repeating patterns using these tiles without flipping them over. This will result in patterns O and 2222, as shown in FIGS. 25 and 33. These patterns have symmetries involving only translations and rotations. They are essentially extensions of FIGS. 37A and 37B. Using just one type of rectangular tile without flipping it over corresponds to those patterns which, in the Conway notation, do not have any "X" or "*".

(b) The user is still restricted only to the tiles pictured in FIG. 6B, but now she is permitted to flip tiles over. This will result in the addition of the patterns XX and 22X, shown in FIGS. 27 and 32, respectively. X stands for "glide reflection". The user will experience glide reflections as she moves the tiles. Flipping over the tiles and sliding them (otherwise they will not mate with the other tiles) corresponds to patterns with an "X" (but without the "*") in the Conway notation.

Step 2: Now the user is permitted to work with tiles in FIGS. 6A and 6B, and she is permitted to flip the tiles over. She will obtain the patterns *2222, *X, **, 2*22, and 22*, shown in FIGS. 26 and 28-31, respectively. Working with both a tile and its complement corresponds to mirror reflecting, which is denoted with a "*" in the Conway notation.

Step 3: Now the user is permitted to work with tiles in FIGS. 2A and 2B. She follows Steps 1-3 in version 1 to construct the patterns *632, 632, 3*33, *333, and 333.

Step 4: The user is permitted to work only with the tiles in FIG. 4A and FIG. 4B. Following the Steps 4-6 in version 1 will enable her to construct the remaining patterns: *442, 4*2, and 442.

Suggested Use, Version 3.

In this version, the user needs to learn the notation for the 17 wallpaper pattern, as shown in FIG. 7. Then the invention can be used in a classroom or other group setting as a game for practicing identifying the notation. Here are some specific examples:

1) Each user is asked to make a pattern and also identify the patterns made by the other users.
2) Given a restricted set of tiles to work with, the user can be asked to make as many distinct patterns as he can with those tiles. He is then asked to determine which of his patterns are mathematically the same.
3) Given one of the 17 possible patterns and the complete set of tiles, the user is asked to make the pattern in as many different ways as possible.

Suggested Use, Version 4.

The plain tiles can be used by students learning basic geometry and trigonometry. For instance, given a set of tiles, a student can be challenged to find all the different shapes into which these tiles can be arranged. This is illustrated in FIGS. 38A and 38C. This exercise can be made more challenging by asking the student to find all the different ways in which the tiles can be arranged to make a given shape, as seen in FIG. 38B. In addition, a student can be asked to make a given shape with the tiles, such as, for example, a trapezoid shown in FIG. 38D. FIGS. 39A, 39B, 40A, 40B, 40C, and 40D and their detailed description illustrate how the tiles can be used to teach students some basic properties of important right triangles. FIGS. 37A, 37B, 37C, and 37D, along with their detailed description, show how the tiles can be used to teach the basic 4 symmetry types of translation, gyration, reflection, and glide reflection.

I claim:

1. A method of assembling the 17 plane periodic patterns said method comprising:
   a. providing a set of tiles, said set of tiles comprising:
      1) at least six identical tiles of a first type, having a planar right triangular shape having two faces and three edges and having angles of 30°, 60°, and 90° between the edges, and having a first male coupling element along the edge that is the shorter leg of the triangle, a second male coupling element along the edge that is the longer leg of the triangle, a third female coupling element along the edge that is the longer leg of the triangle, a fourth male coupling element along the edge that is the hypotenuse of the triangle and a fifth female coupling element along the edge that is the hypotenuse of the triangle, all said coupling elements having a centerline and all said coupling elements having a location of the centerlines along the edges, and,
   2) at least six identical tiles of a second type, having a planar right triangular shape having two faces and three edges and having angles of 30°, 60°, and 90° between the edges, and having a first female coupling element along the edge that is the shorter leg, a second female coupling element along the edge that is the longer leg of the triangle, a third male coupling element along the edge that is the longer leg, a fourth female coupling element along the edge that is the hypotenuse of the triangle and a fifth male coupling element along the edge that is the hypotenuse of the triangle, all said coupling elements having a centerline and all said coupling elements having a location of the centerlines along the edges, and, the locations of the first second, third, fourth and fifth coupling elements along the edges being the same as the locations of the first, second, third, fourth and fifth coupling elements of the tiles of the first type along their edges, and,
   3) at least six identical tiles of a third type said tiles being identical to the tiles of the first type but further including an asymmetric pattern on each side of each tile, said asymmetric patterns being the same on both sides and on all tiles, and the patterns having a location and an orientation on the faces of the tiles, said locations and orientations being the same on all faces and all tiles,
   4) at least six identical tiles of a fourth type said tiles being identical to the tiles of the second type but further including an asymmetric pattern on each side of each tile said asymmetric patterns being the same on both sides and on all tiles the same as the asymmetric patterns on the tiles of the third type and the patterns having a location and an orientation on the faces of the tiles, said locations and orientations being the same on all faces and all tiles, and, said locations and orientations being the same as the locations and orientations of the asymmetric patterns on the tiles of the third type, and,
   5) wherein the size and location of the coupling elements on the tiles of the first, second, third and fourth types provide for mutual interlocking of the tiles such that the tiles may be interlocked only with long edges adjoined to one another, short edges adjoined to one another and hypotenuses adjoined to one another, and,
   6) wherein tiles of the first, second, third and fourth type may be selected and joined to form patterns displaying the symmetry of the plane periodic patterns identified in Conway notation as O, 2222, 22X, XX, **, *X, *2222, 2*22, 22*, 333, 632, *333, 3*3 and *632,
   7) at least four identical tiles of a fifth type having a planar right triangular shape with two faces and three edges and having angles of 45°, 45°, and 90° between the edges and having a first, female, coupling element along a first edge that is a first leg of the triangle and a second, male, coupling element along the first edge and a third, female, coupling element along the edge that is the second leg of the triangle and a fourth, male, coupling element along the second edge and fifth, female, coupling element along the edge that is the hypotenuse of the triangle and a sixth, male, coupling element along the hypotenuse each of the coupling elements having a centerline and a location along the edge that is defined by the locations of the centerlines, 8) at least four identical tiles of a sixth type said tiles being identical to the tiles of the fifth type but further including an asymmetric pattern on each side of each tile said asymmetric patterns being the same on both sides and on all tiles and is the same as the asymmetric patterns on the tiles of the third type and the patterns having a location and an orientation on the faces of the tiles said locations and orientations being the same on all faces and all tiles, and 9) at least four identical tiles of a seventh type said tiles being identical to the tiles of the sixth type except that the first, third, and fifth coupling elements are male coupling elements and the second, fourth and sixth coupling elements are female coupling elements, 10) wherein the size and location of the coupling elements on the tiles of the fifth, sixth and seventh types provide for mutual interlocking of the tiles such that the tiles may be interlocked only with hypotenuses adjoined to one another and legs joined to one another, and 11) wherein tiles of the fifth, sixth and seventh types may be selected and joined to form patterns displaying the symmetry of the plane periodic patterns identified in Conway notation as O, 2222, 22X, XX, **, *X, *2222, 2*22, 22*, 442, *442 and 4*2, b. assembling the tiles of the third type and the fourth type in a pattern such that each tile is adjacent to its complementary tile whereby a *632 pattern is formed, and, c. assembling a pattern with a design and no mirror image from the *632 pattern by either replacing the tiles of the third type with tiles of the first type or replacing tiles of the fourth type with tiles of the second type thereby assembling a 632 pattern, d. assembling a pattern from the *632 pattern by replacing a portion of equilateral triangles made from 2 tiles of the third and fourth types with equilateral triangles made from 2 tiles of the first and second type wherein none of the equilateral triangles thereby formed from tiles of the first and second type have sides that adjoin sides of another equilateral triangle formed from tiles of the first and second type and none of the remaining equilateral triangles made from tiles of the third and fourth type have sides that adjoin sides of another equilateral triangle made from tiles of the third and fourth type thereby forming a 3*3 pattern, and, e. assembling a pattern from the *632 pattern by replacing a portion of equilateral triangles made from 6 tiles of the third and fourth type with equilateral triangles made from 6 tiles of the first and second type wherein none of the equilateral triangles thereby formed from tiles of the first and second type have sides that adjoin sides of another equilateral triangle formed from tiles of the first and second type and none of the remaining equilateral triangles made from tiles of the third and fourth type have sides that adjoin sides of another equilateral triangle form same correction as in step d above tiles formed from the third and fourth type thereby forming a *333 pattern, and, f. assembling a pattern from either the 3*3 pattern or the *333 pattern by either replacing the tiles of the third type with tiles of the first type or replacing the tiles of fourth type with tiles of second type thereby forming a 333 pattern, g. using only the tiles of sixth type and the seventh type to make a pattern such that each tile is adjacent to its complementary tile thereby forming a *442 pattern, and, h. assembling a pattern from the *442 pattern by either replacing the tiles of the sixth type with tiles of the fifth type or replacing the tiles of the seventh type with tiles of the fifth type thereby creating a 442 pattern, i. assembling a pattern from the *442 pattern by replacing a portion of four tile squares made from 2 tiles of the sixth type and 2 tiles of the seventh type with four tile squares made from 4 tiles of the fifth type wherein none of the four tile squares thereby formed from tiles of the fifth type have sides that adjoin sides of other four tile squares made from tiles of the fifth type and none of the four tile squares made from 2 tiles of the sixth type and 2 tiles of the seventh type have sides that adjoin other four tile squares made from 2 tiles of the sixth type and 2 tiles of the seventh type thereby creating a *2222 pattern, j. assembling a pattern from the *442 pattern by replacing a portion of isosceles triangles made from a tile of the sixth type and a tile of the seventh type with an isosceles triangle made from two tiles of the fifth type wherein none of the isosceles triangles made from two tiles of the fifth type have sides that adjoin other isosceles triangle made from two tiles of the fifth type and none of the isosceles triangles made from a tile of the sixth type and a tile of the seventh type have sides that adjoin other isosceles triangles made from a tile of the sixth type and a tile of the seventh type thereby creating the 4*2 pattern, k. assembling a pattern from the *442 pattern by replacing a portion of the squares made from a tile of the sixth type and a tile of the seventh type with a square made from two tiles of the fifth type wherein none of the squares made with two tiles of the fifth type have sides that adjoin other squares made from two tiles of the fifth type and none of the squares made from a tile of the sixth type and a tile of the seventh type have sides that adjoin a square made with a tile of the sixth type and a tile of the seventh type thereby creating a 2*22 pattern, l. assembling a pattern from the *2222 pattern by replacing either the tiles of the sixth type with tiles of the fifth type or replacing the tiles of the seventh type with tiles of the fifth type thereby creating a 2222 pattern, m. assembling a pattern from the *2222 pattern by replacing a portion of isosceles triangles made from 2 tiles of the sixth and seventh types with isosceles triangles made from 2 tiles of the fifth types wherein every tile of the fifth type is thereby part of a parallelogram of 8 adjoining tiles thereby forming a 22* pattern, n. assembling a pattern from the 22* pattern by replacing isosceles triangles made of one tile of the sixth type and one tile of the seventh type the tiles of the sixth type with tiles of the fifth type or the tiles of the seventh type with tiles of the fifth type thereby resulting in alternating rows containing either only tiles of the sixth type and tiles of the fifth type or tiles of the seventh type and tiles of the fifth type thereby creating a 22X pattern, o. assembling a pattern from the *2222 pattern by replacing isosceles triangles made from a tile of the sixth type and a tile of the seventh type in alternating rows of such triangles with isosceles triangles made from two tiles of the fifth type thereby creating a  pattern, p. assembling a pattern from the  pattern by either replacing all tiles of the sixth type with tiles of the fifth type or all tiles of the seventh type with tiles of the fifth type thereby creating an O pattern, q. assembling a pattern from the ** pattern by replacing in alternating columns of tiles, all tiles of the sixth type with tiles of the fifth type and replacing all tiles of the seventh type with tiles of the fifth type thereby creating a *X pattern, r. assembling a pattern from the ** pattern by replacing, in alternating rows that contain isosceles triangles made from a tile of the sixth type and a tile of the seventh type, the tiles of the sixth type with tiles of the fifth type alternating by row with replacing the tiles of the seventh type with tiles of the fifth type thereby creating a XX pattern.

\* \* \* \* \*